(12) United States Patent
Tsai

(10) Patent No.: US 9,717,323 B2
(45) Date of Patent: Aug. 1, 2017

(54) SPLIT TYPE HANGING BUCKLE

(71) Applicant: Hai Pin Tsai, Hong Kong (CN)

(72) Inventor: Hai Pin Tsai, Hong Kong (CN)

( * ) Notice: Subject to any disclaimer, the term of this patent is extended or adjusted under 35 U.S.C. 154(b) by 43 days.

(21) Appl. No.: 14/977,884

(22) Filed: Dec. 22, 2015

(65) Prior Publication Data

US 2016/0113381 A1    Apr. 28, 2016

Related U.S. Application Data

(63) Continuation of application No. 14/029,854, filed on Sep. 18, 2013, now Pat. No. 9,249,814.

(51) Int. Cl.
| | | |
|---|---|---|
| *A45F 5/00* | (2006.01) | |
| *F16B 1/00* | (2006.01) | |
| *F16B 45/00* | (2006.01) | |
| *A44B 15/00* | (2006.01) | |
| *F16B 2/20* | (2006.01) | |
| *A44B 11/25* | (2006.01) | |
| *A45F 5/02* | (2006.01) | |

(52) U.S. Cl.
CPC .......... *A45F 5/004* (2013.01); *A44B 11/2584* (2013.01); *A44B 15/00* (2013.01); *A45F 5/02* (2013.01); *F16B 1/00* (2013.01); *F16B 2/20* (2013.01); *F16B 45/00* (2013.01); *F16B 2001/0035* (2013.01); *Y10T 24/1379* (2015.01); *Y10T 24/1394* (2015.01); *Y10T 24/1397* (2015.01); *Y10T 24/32* (2015.01); *Y10T 24/3408* (2015.01); *Y10T 24/3413* (2015.01); *Y10T 24/4736* (2015.01); *Y10T 24/4745* (2015.01)

(58) Field of Classification Search
CPC . A45F 5/02; A45F 5/004; A44B 15/00; A44B 11/2584; F16B 2/20; F16B 1/00; F16B 45/00; F16B 2001/0035; Y10T 24/1394; Y10T 24/3408; Y10T 24/1397; Y10T 24/1379; Y10T 24/4736; Y10T 24/4745; Y10T 24/3413; Y10T 24/32
See application file for complete search history.

(56) References Cited

U.S. PATENT DOCUMENTS

| | | |
|---|---|---|
| 3,700,206 A | 10/1972 | Jones |
| 4,614,321 A | 9/1986 | Andre |

(Continued)

*Primary Examiner* — Robert J Sandy
*Assistant Examiner* — Louis Mercado
(74) *Attorney, Agent, or Firm* — Garcia-Zamor IP Law; Ruy M. Garcia-Zamor

(57) ABSTRACT

A split type hanging buckle includes a base and a connecting element, the base includes a top cover and a bottom cover, the top cover has a receiving groove, one end of the bottom cover has an accommodating groove, the accommodating groove corresponds to the receiving groove, the connecting element includes a first magnetic element, a second magnetic element, a connecting part and a fitting part, the first magnetic element is received in the accommodating groove, one end of the connecting part has an inserting part and a clamping part, one end of the inserting part has an receiving cavity, the second magnetic element is received in the receiving cavity, and after the second magnetic element is received in the receiving cavity, portions of the second magnetic element away from the inserting part attract the first magnet element, such that the connecting element is connected with the base.

17 Claims, 37 Drawing Sheets

(56) References Cited

U.S. PATENT DOCUMENTS

| | | | |
|---|---|---|---|
| 5,026,016 A * | 6/1991 | Lisowski | H04R 1/08 |
| | | | 248/225.11 |
| 5,106,223 A | 4/1992 | Kraus | |
| 5,353,441 A | 10/1994 | Lazorchak | |
| 5,622,296 A | 4/1997 | Pirhonen et al. | |
| 5,927,580 A | 7/1999 | Ward-Llewellyn | |
| 6,484,370 B2 | 11/2002 | Kanie et al. | |
| 7,178,855 B2 | 2/2007 | Catron et al. | |
| 9,555,935 B2 * | 1/2017 | Fiedler | A45C 13/1069 |
| 9,605,696 B1 * | 3/2017 | May | F16B 1/00 |
| 2001/0042273 A1 | 11/2001 | Chaffee | |
| 2004/0083583 A1 | 5/2004 | Bradley et al. | |
| 2004/0159208 A1 | 8/2004 | Yasunori | |
| 2005/0278903 A1 * | 12/2005 | Dunaye | A44C 5/2071 |
| | | | 24/303 |
| 2007/0099469 A1 * | 5/2007 | Sorensen | A45F 5/02 |
| | | | 439/289 |
| 2008/0209698 A1 | 9/2008 | Colorado | |
| 2010/0199467 A1 | 8/2010 | Morejon | |
| 2010/0327031 A1 * | 12/2010 | Olmos | A45F 5/02 |
| | | | 224/269 |
| 2011/0240493 A1 | 10/2011 | Adams et al. | |
| 2011/0265289 A1 * | 11/2011 | Wu | A45C 13/1069 |
| | | | 24/303 |
| 2012/0291227 A1 * | 11/2012 | Fiedler | A42B 3/04 |
| | | | 24/3.3 |
| 2013/0048813 A1 | 2/2013 | Liu et al. | |

* cited by examiner

SPLIT TYPE HANGING BUCKLE

CROSS REFERENCE TO RELATED APPLICATIONS

This application is a continued application of U.S. application Ser. No. 14/029,854, filed on Sep. 18, 2013, now U.S. Pat. No. 9,249,814, entitled, "Split type hanging buckle". The disclosures of the above identified application are incorporated herein by reference.

BACKGROUND

1. Technical Field

The present disclosure generally relates to a hanging buckle, especially relates to a split type hanging buckle.

2. Description of Related Art

In the daily life, the hanging buckle is usually used to hang keys, mobile phone, name tag, ID card and so on. Generally, the traditional hanging buckle includes a base part that is provided with hook to hook or clamp fixing members like straps, as well as a hanging buckling member used to hang ID card, name tag, keys, mobile phone, pen, small tool and so on. The hook member and hanging member of this type of traditional hanging buckle are separately connected on the base part.

To prevent stuffs hung on the hanging member from falling off, the hook member and hanging member are generally fixedly connected with the base part so they are not easy to be separated. For example, a staff badge hanger disclosed in the Chinese patent 201320039323.2, which comprises a hanging buckle, a connecting member and a strap mechanism, wherein the hanging buckle is connected with the strap mechanism through the connecting member; the strap mechanism can be provided with clamp or hook on the outer case body thereof to form the base part that can be hooked or clamped on the clothes or strap; the hanging buckle is the hanging member used to hang stuffs, and the connecting member is used to connect the strap mechanism and the hanging buckle. In this type of staff badge hanger, although the distance between the staff badge and the strap mechanism can be adjusted through the scrolled strap, the stuffs hung thereon cannot be taken off easily, which influences the flexibility in the actual use.

As stated above, it is necessary to further improve the structure of the existing hanging buckle.

SUMMARY

The disclosure is to offer a split type hanging buckle.

The split type hanging buckle comprises a base and a connecting element connected with the base. The base comprises a top cover and a bottom cover, the top cover has a receiving groove, one end of the bottom cover closing to the connecting element has an accommodating groove, the accommodating groove corresponds to the receiving groove, the connecting element includes a first magnetic element, a second magnetic element attracting the first magnetic element, a connecting part and a fitting part, the first magnetic element is received in the accommodating groove, one end of the connecting part has an inserting part and a clamping part, and the inserting part is located on a surface of the clamping part, one end of the inserting part has an receiving cavity, the second magnetic element is received in the receiving cavity, after the second magnetic element being received in the receiving cavity, and the first magnetic being received in the accommodating groove, portions of the second magnetic element away from the inserting part attract the first magnet element, such that the connecting element is connected with the base.

Preferably, parts of the fitting part and the inserting part are received in the receiving groove, such that the connecting part and the fitting part are both connected with the base.

Preferably, two opposite stops are formed on two opposite sidewalls of the receiving groove respectively; one end of the fitting part has two opposite pressing plates, one end of each pressing plate has one bulge, the bulges are fitted on corresponding stops, such that the connecting element is connected with the base.

Preferably, plate further has a lug, one end of the connecting part away from the inserting part further has an accommodating cavity, the accommodating cavity has two opposite side openings and a bottom opening, the bottom opening is located between the two side openings, the fitting part passes through the bottom opening to be received in the accommodating groove, the bulges and the lugs pass through the side openings to be exposed from the side openings respectively.

Preferably, a clamping element is located between the two pressing plates, a surface of the clamping element has a flanging element; an elastic element is formed on a sidewall of the accommodating groove, the flanging element resist and press the elastic element, such that the connecting part is connected with the fitting part.

Preferably, the two pressing plates are pressed towards each other, such that the bulges move towards each other to be released from the stops, and the lugs move towards each other to be received in the accommodating cavity.

Preferably, the elastic element is pressed towards a middle of the connecting part, and then the elastic element is released, and the elastic element rebounds back, such that the flanging element is released from the elastic element, and the connecting part is separated from the fitting part.

Preferably, two opposite limiting elements are formed on two opposite sides of the end of the connecting part closing to the fitting part, the fitting part is pulled to move away from the base, when the bulges of the fitting part moves to a bottom of the accommodating groove, the bulges are stopped by the limiting elements, such that the fitting part is connected with the connecting part through the bulges and the limiting elements.

Preferably, one end of the fitting part away from the base has a connecting member, a middle area of the connecting member has a receiving hole, the receiving hole is a through hole, one end of the connecting member has a switch, the switch opens or locks the connecting member, such that objects are received in the receiving hole to be connected with the fitting part through the switch.

Preferably, an inner surface of the connecting member further has a slot, the slot extends along an axis of the connecting member, the slot ensure that the switch open or lock the connecting member smoothly.

Preferably, the first magnetic element and the second magnetic element are made of magnet, or various kinds of metals which attract magnet.

Preferably, the first magnetic element and the second magnetic element are made of magnet; the first magnetic element is made of magnet, and the second magnetic element is made of metal which attracts magnet; or the second magnetic element is made of magnet, the first magnetic element is made of metal which attracts magnet.

Preferably, a diameter of the clamping part is bigger than a diameter of the inserting part.

Preferably, the split type hanging buckle further includes a clip connected with the bottom cover.

Preferably, a groove is formed on an inner surface of the top cover, another groove is formed on a surface of the bottom cover facing the top cover, the groove of the top cover and the groove of the bottom cover cooperatively form a receiving space.

Preferably, a supporter is located at the groove of the top cover, a coil brace is received in the receiving space, and the coil brace is arranged around the supporter, the coil coils the coil brace.

Preferably, one end of the coil pass through the accommodating groove and the hole of the inserting part, and parts of the coil exposed from the accommodating groove and the hole of the inserting part are received in the inserting part and connected with the inserting part.

Preferably, the coil rebounds back automatically towards the base, the connecting part and the fitting part connected with the coil are driven by the coil to move towards the base, until the inserting part is received in the receiving groove, and the second magnetic element attracts the first magnetic element to connect the connecting element with the base.

Preferably, the base is a displaying window.

Compared to the prior art, the beneficial effects of the present invention are as follows: the first magnetic element is received in the accommodating groove of the bottom cover to be connected with the bottom cover, and the first magnetic element is received in the receiving cavity of the inserting part, the first magnetic element can attract the second magnetic element, such that the base can be connected with the connecting element through the first magnetic element and the second magnetic element. The connecting element can be pulled to move away from the base, such that the connecting element can be separated from the base.

Furthermore, the flanging element of the inserting part can resist and press the elastic element of the connecting part, such that the inserting part can be fixed in the connecting part. The elastic element is pressed towards the middle of the connecting part, and then the elastic element is released, and the elastic element rebounds back, such that the flanging element can be released from the elastic element, such that the connecting part is separated from the fitting part.

Furthermore, the fitting part is pulled to move away from the base, when the bulges of the fitting part moves to a bottom of the accommodating groove, the bulges are stopped by limiting elements, such that the fitting part is connected with the connecting part through the bulges and the limiting elements.

Furthermore, the slot formed on the inner surface of the connecting member can ensure that the switch open or lock the connecting member smoothly. Furthermore, the slots can also ensure that a using life of the connecting member 373 is increased.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
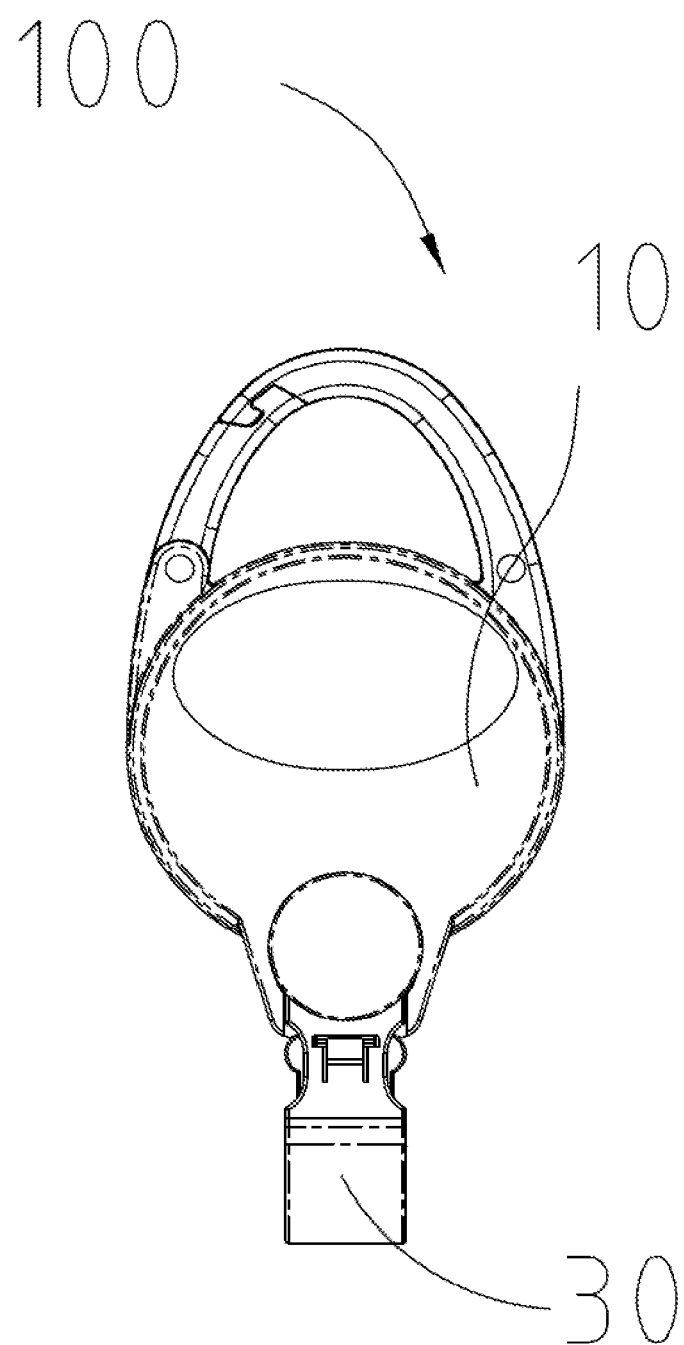
FIG. 1 is a front view of a split type hanging buckle according to a first exemplary embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
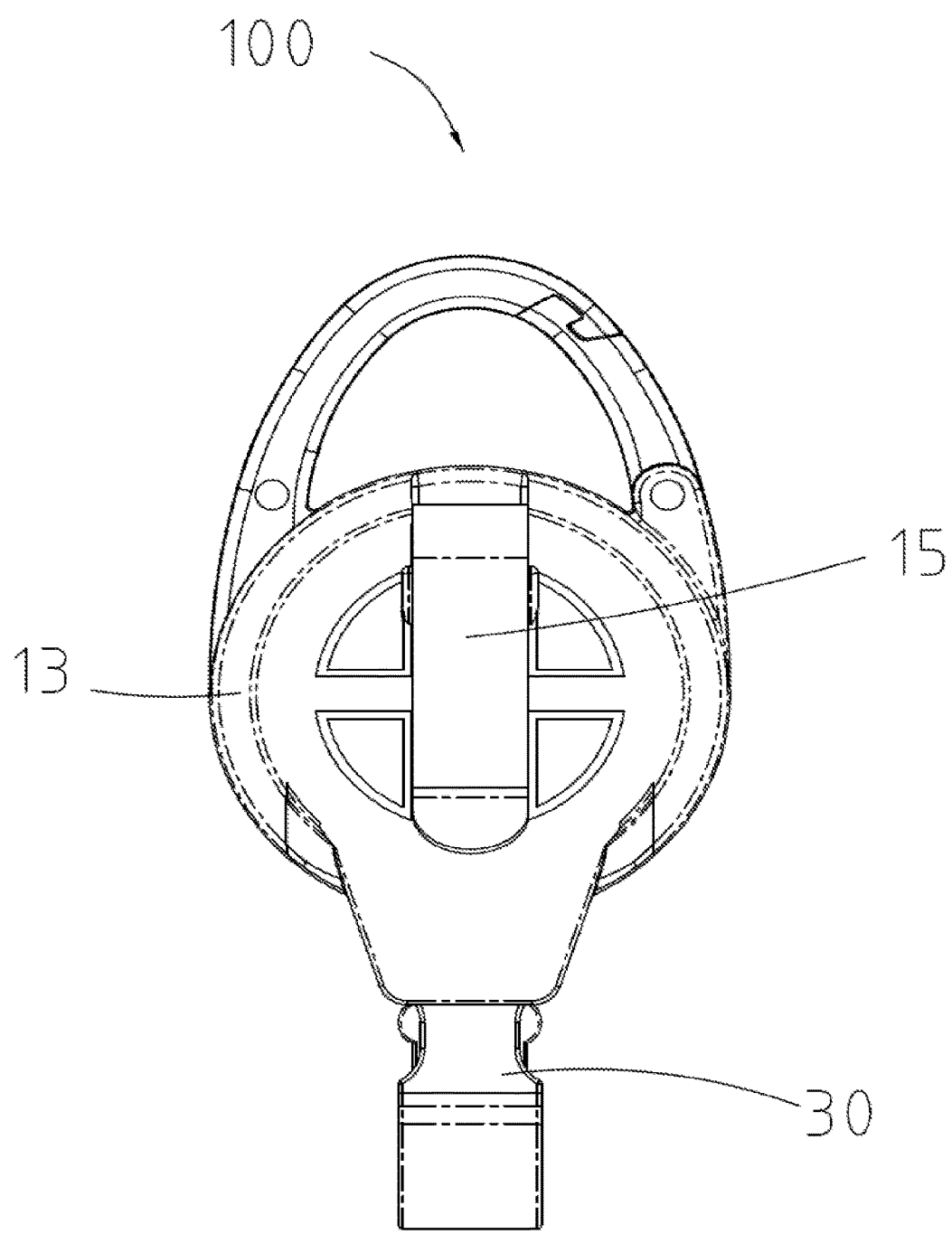
FIG. 2 is a back view of the split type hanging buckle according to the first exemplary embodiment.
Figure 3:
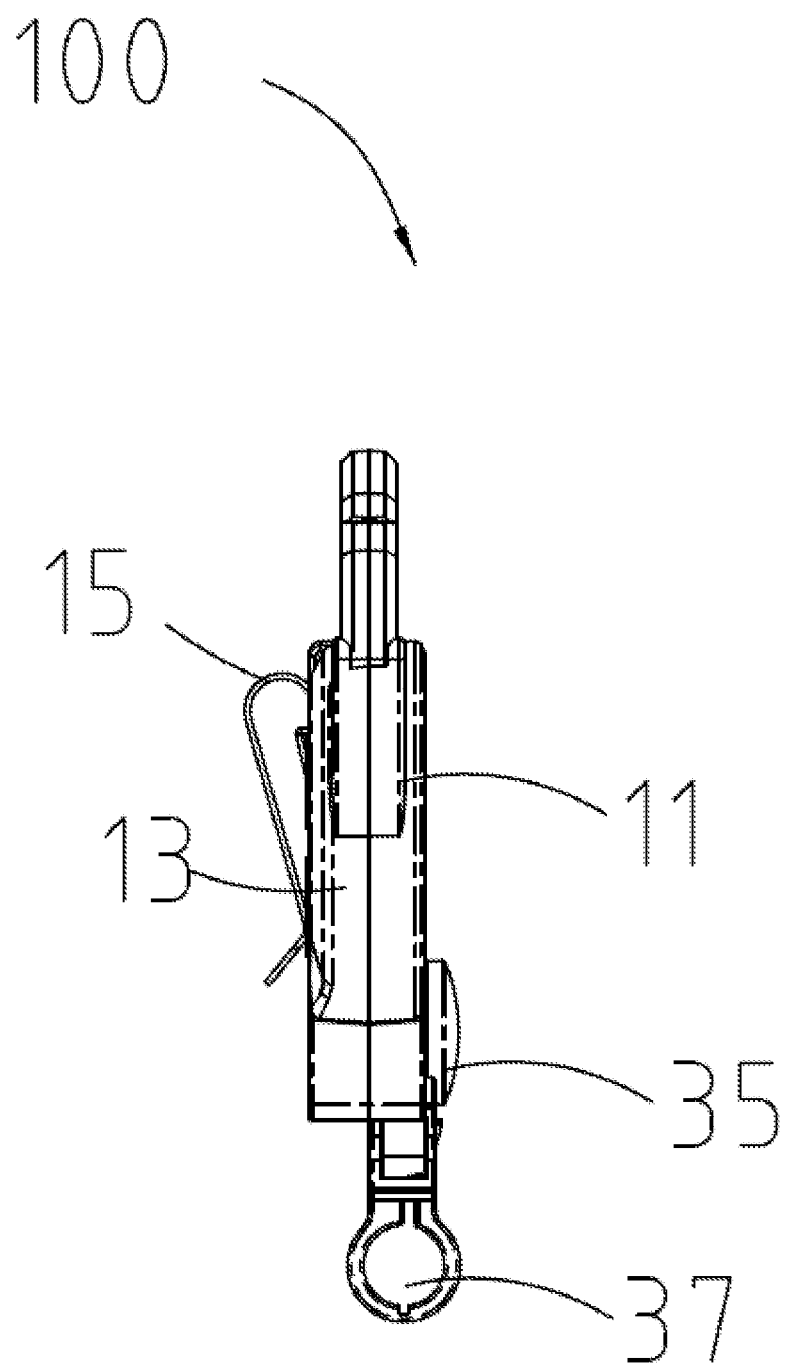
FIG. 3 is a side view of the split type hanging buckle according to the first exemplary embodiment.
Figure 4:
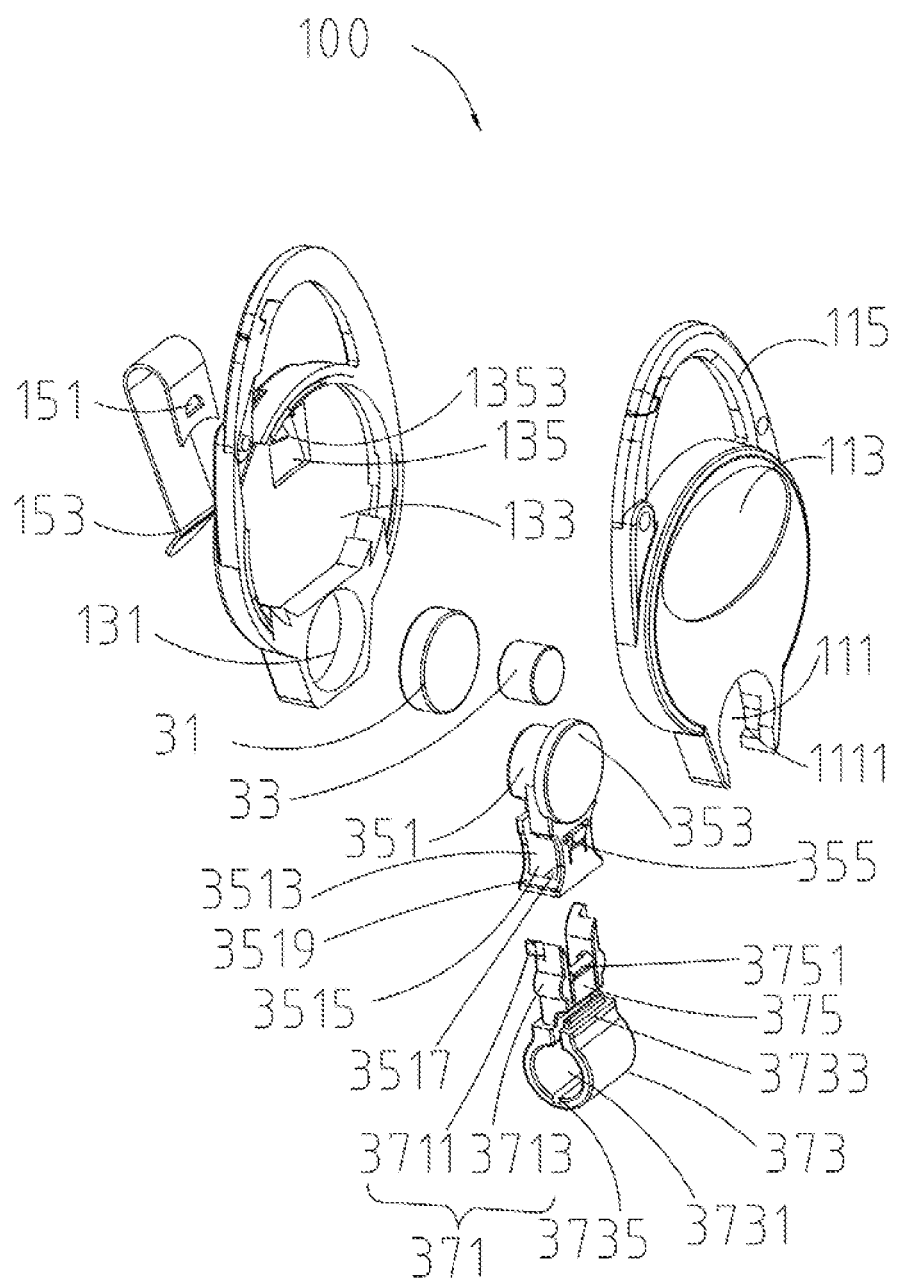
FIG. 4 is an exploded isometric view of the split type hanging buckle according to the first exemplary embodiment.
Figure 5:
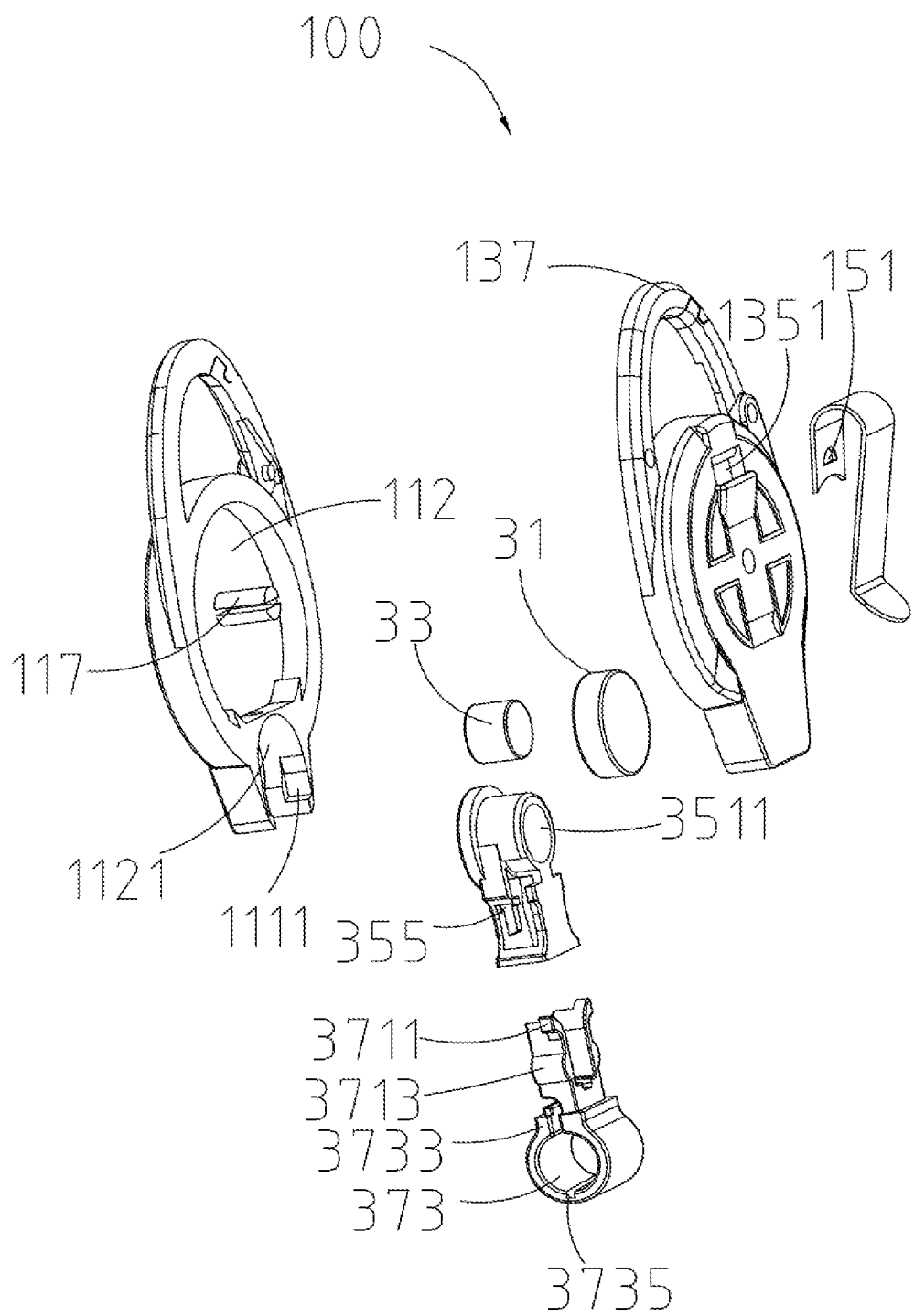
FIG. 5 is similar to FIG. 4, but shown in another view.
Figure 6:
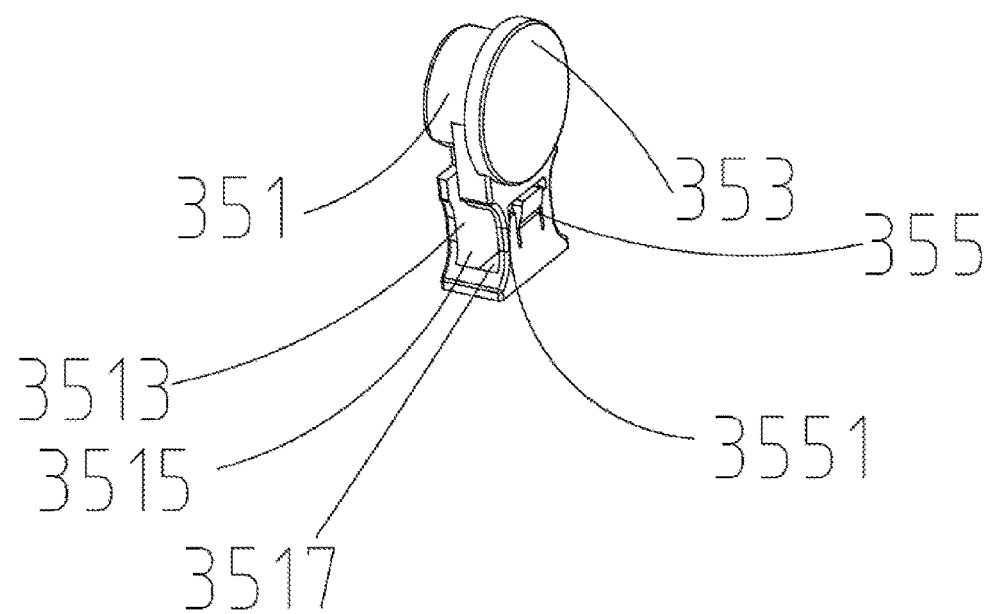
FIG. 6 is an enlarged isometric view of a connecting element of the split type hanging buckle according to the first exemplary embodiment.
Figure 7:
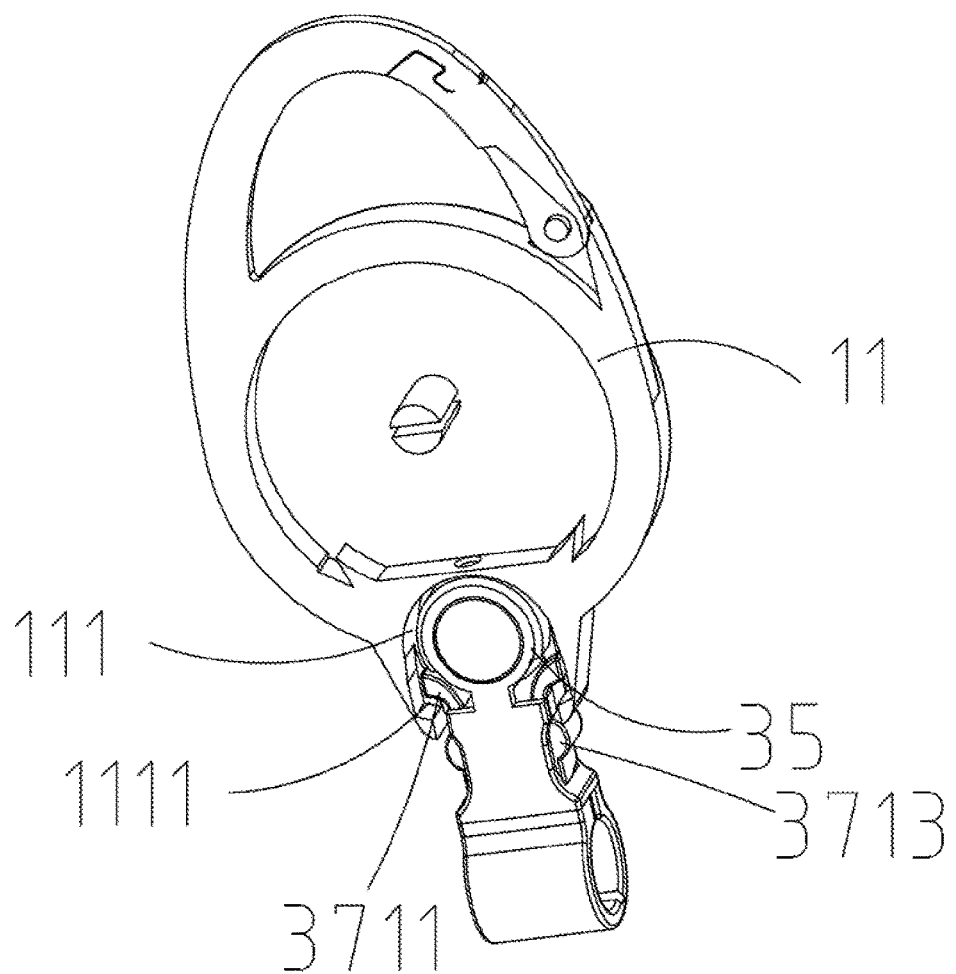
FIG. 7 is an isometric view of the connecting element and a top cover of the split type hanging buckle according to the first exemplary embodiment.
Figure 8:
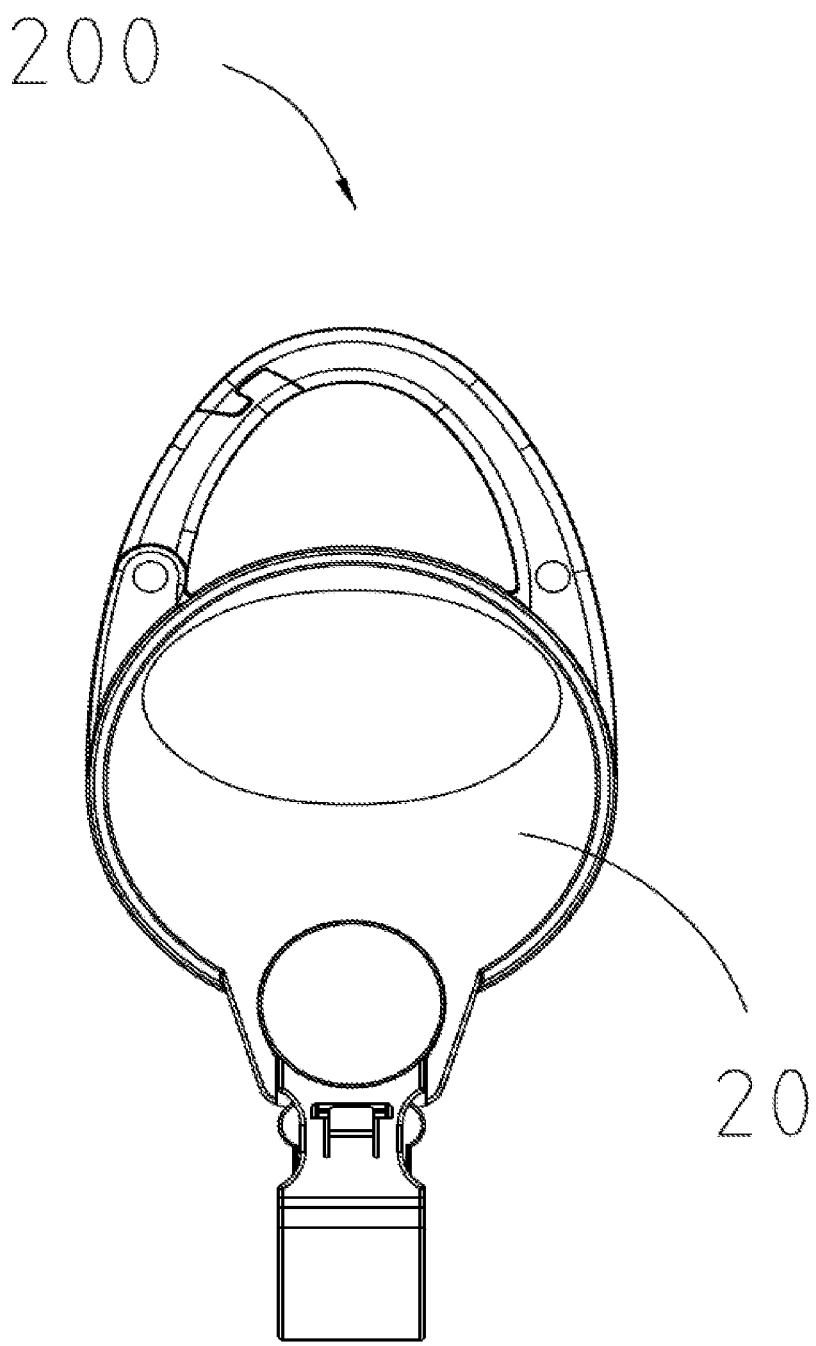
FIG. 8 is a front view of a split type hanging buckle according to a second exemplary embodiment.
Figure 9:
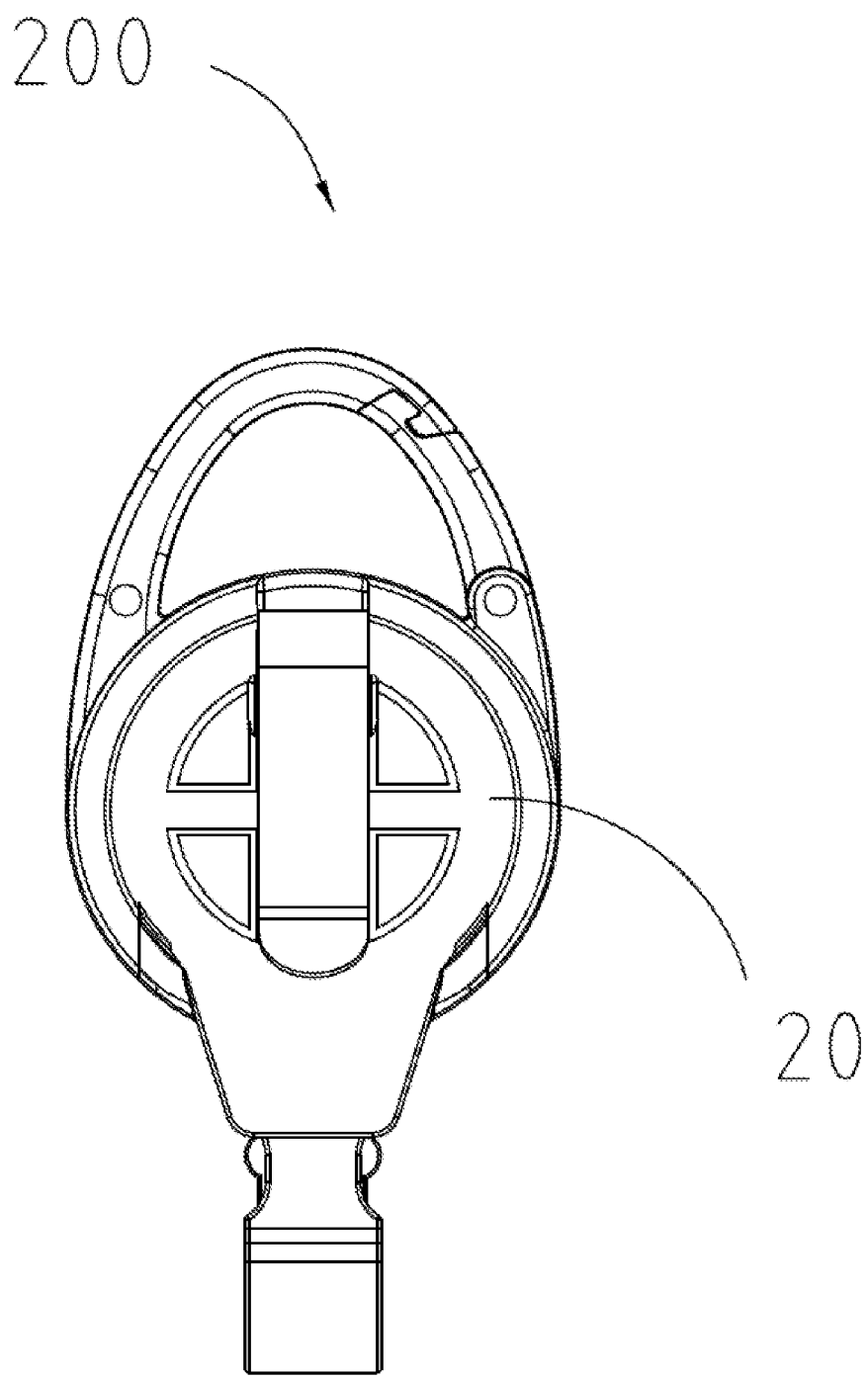
FIG. 9 is a back view of the split type hanging buckle according to the second exemplary embodiment.
Figure 10:
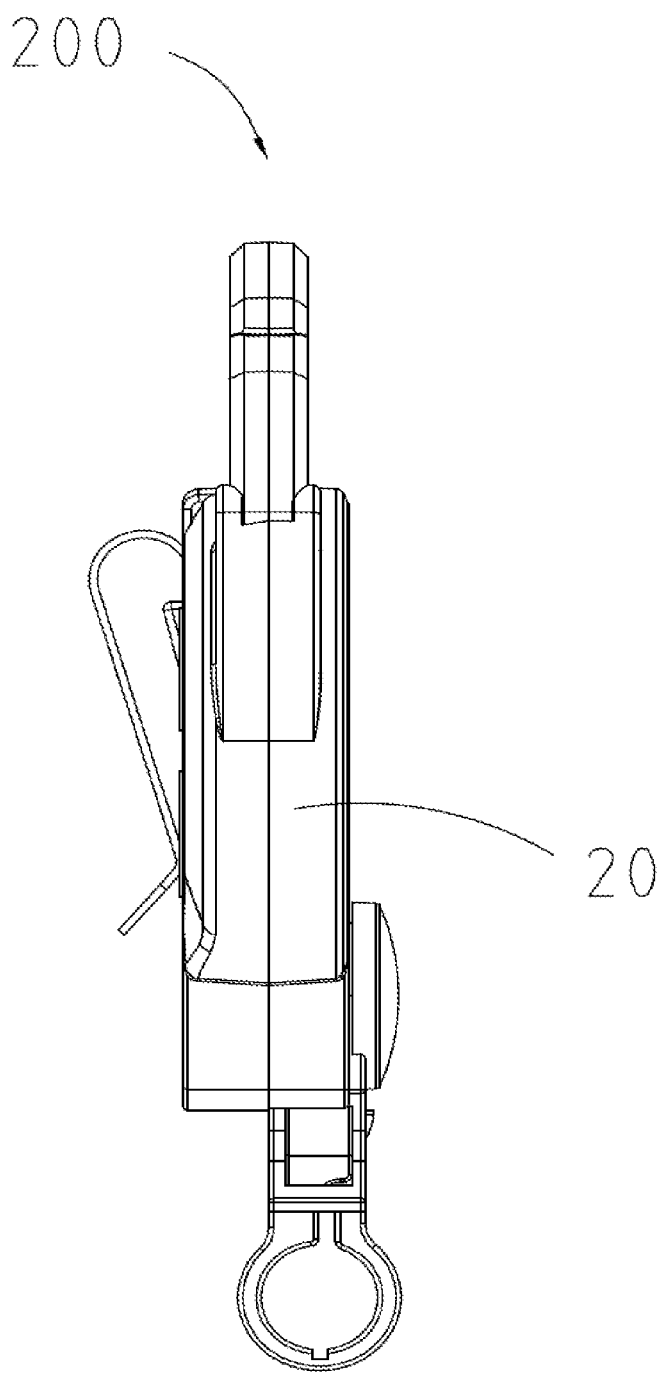
FIG. 10 is a side view of the split type hanging buckle according to the second exemplary embodiment.
Figure 11:
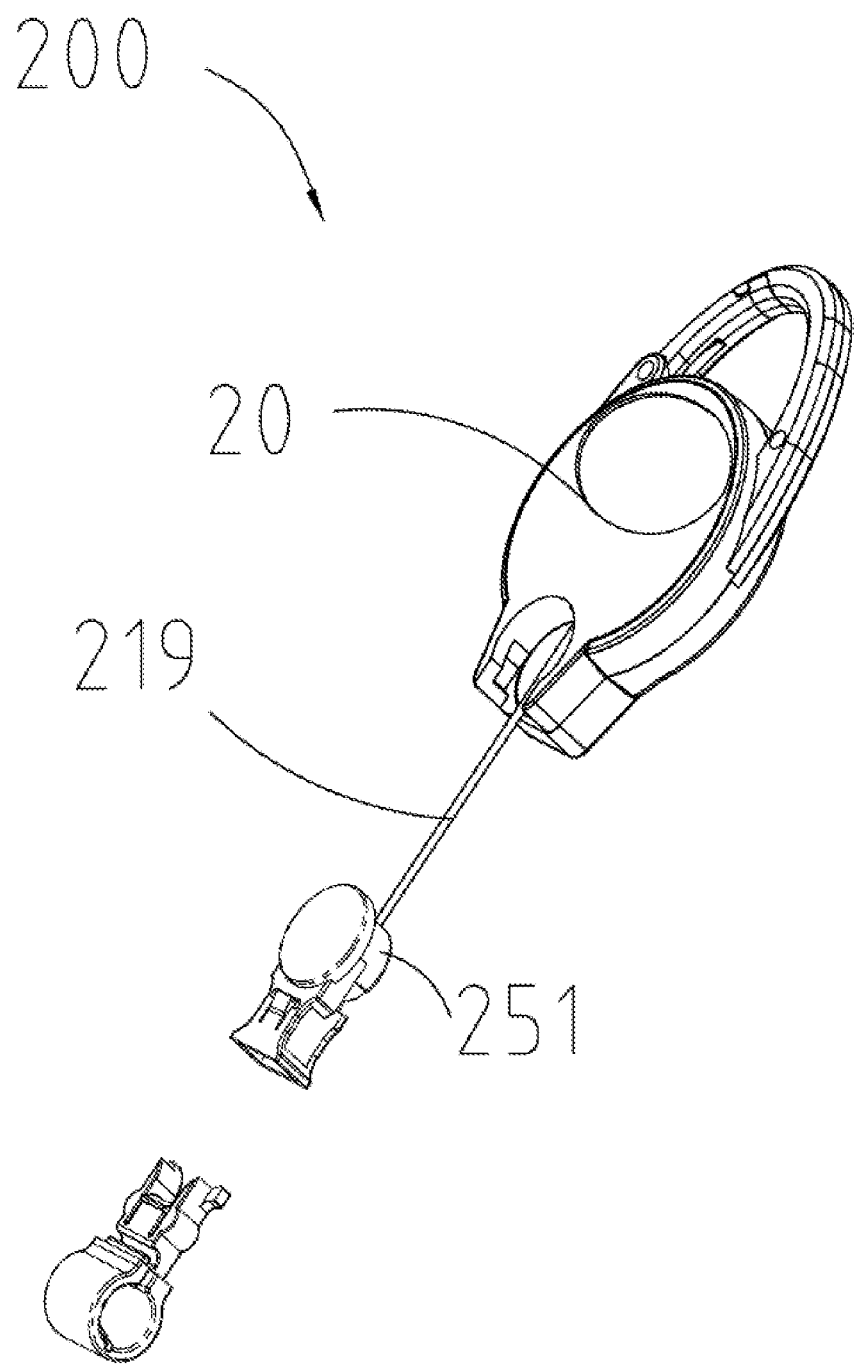
FIG. 11 is an exploded isometric view of the split type hanging buckle according to the second exemplary embodiment.
Figure 12:
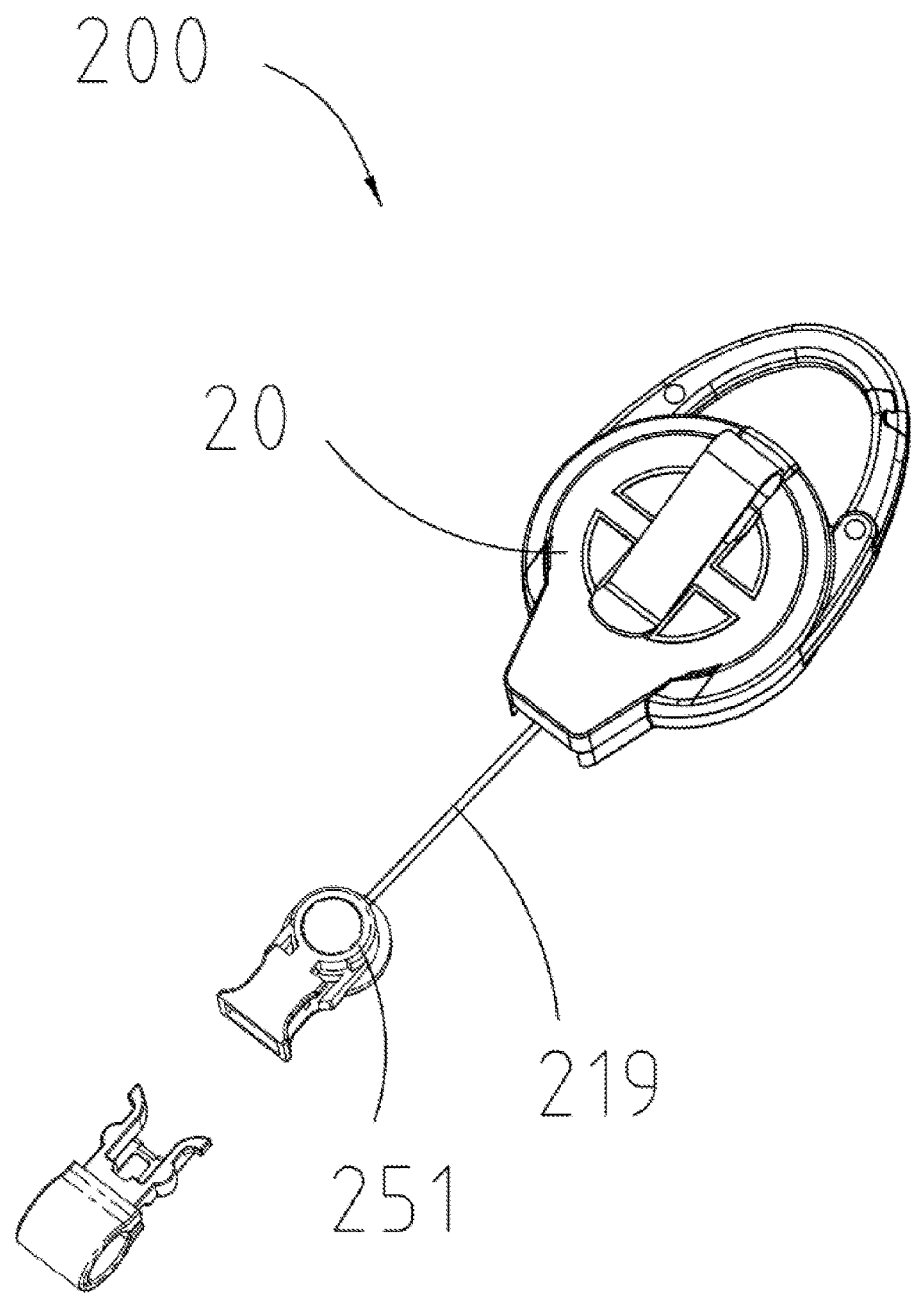
FIG. 12 is similar to FIG. 11, but show in another view.
Figure 13:
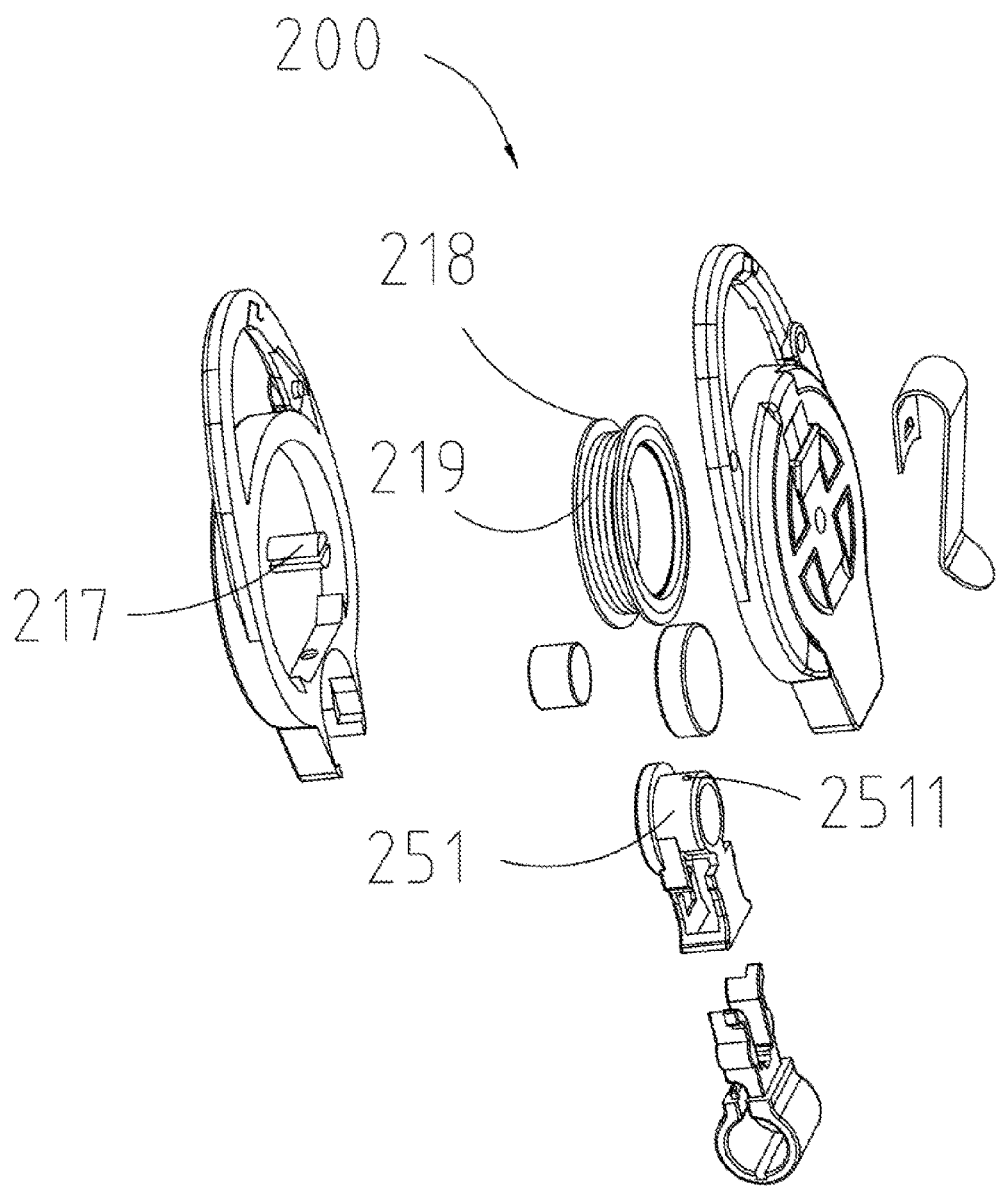
FIG. 13 is another exploded isometric view of the split type hanging buckle according to the second exemplary embodiment.
Figure 14:
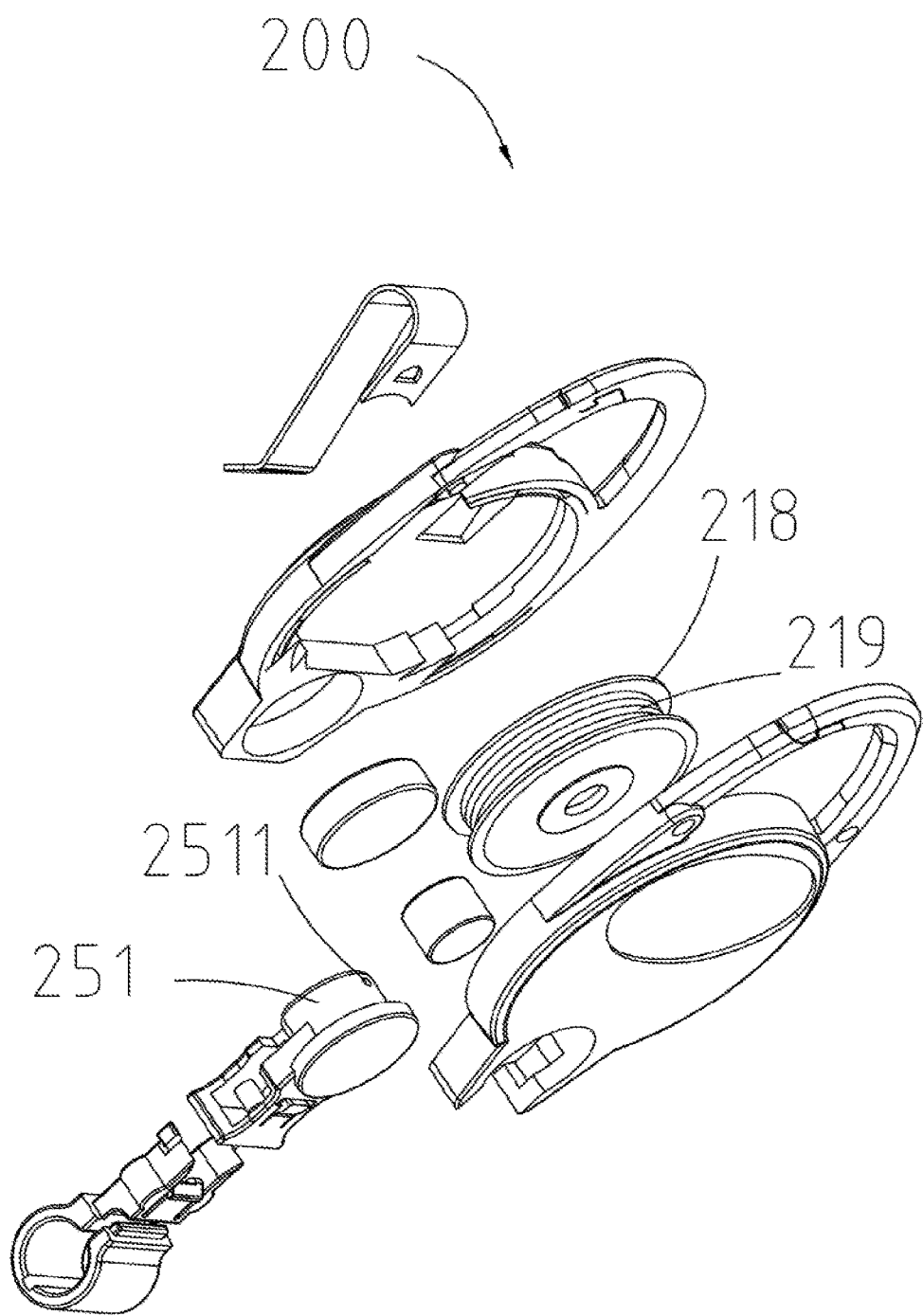
FIG. 14 is similar to FIG. 13, but shown in another view.
Figure 15:
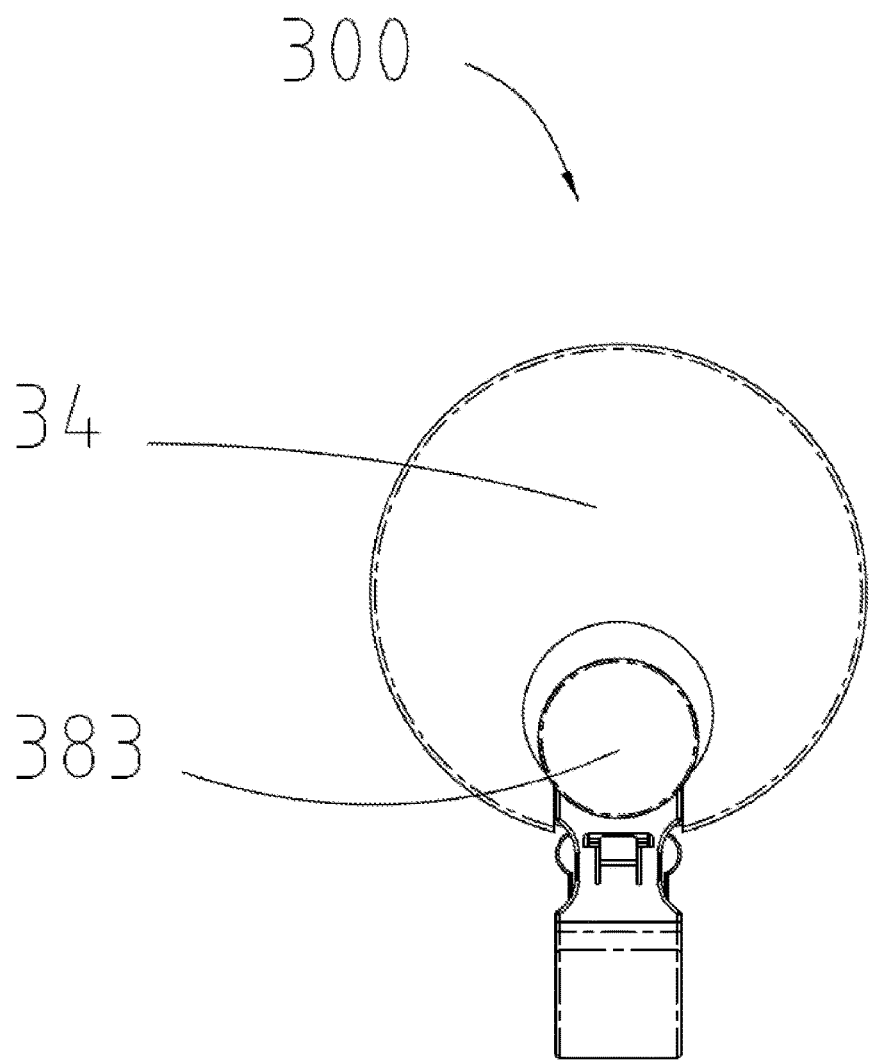
FIG. 15 is a front view of a split type hanging buckle according to a third exemplary embodiment.
Figure 16:
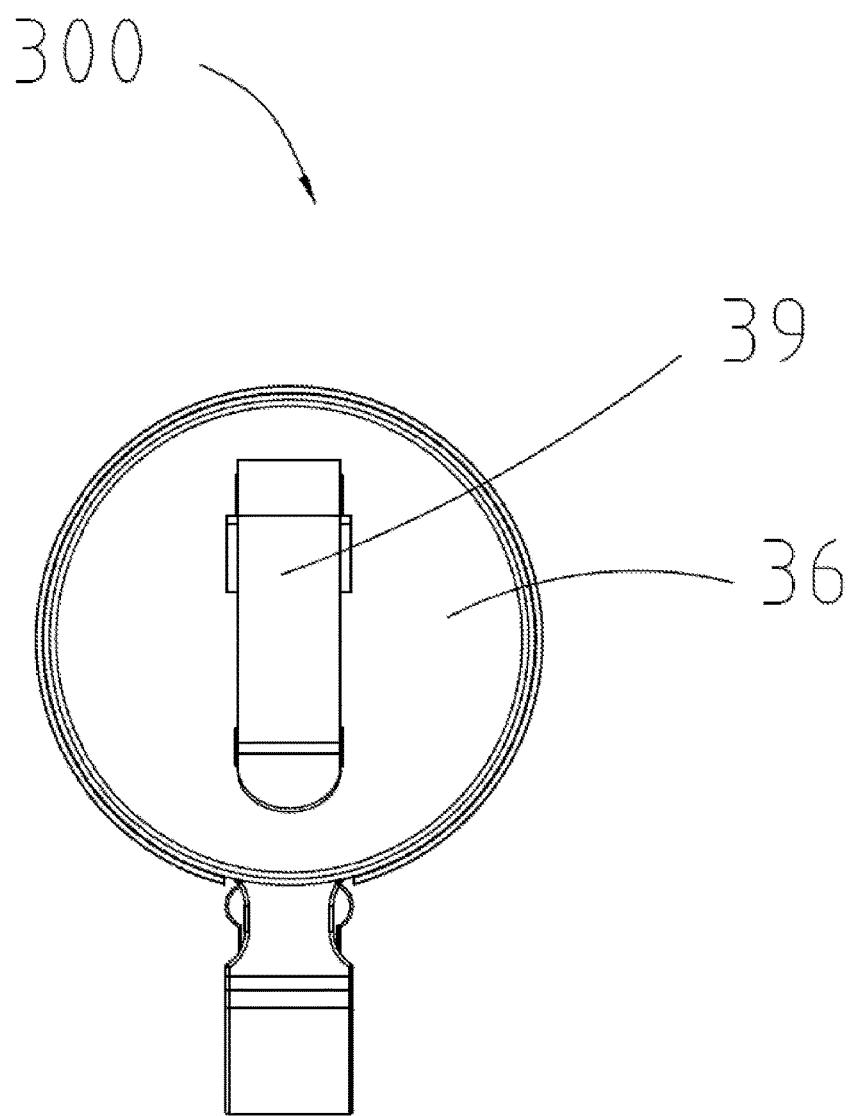
FIG. 16 is a back view of the split type hanging buckle according to the third exemplary embodiment.
Figure 17:
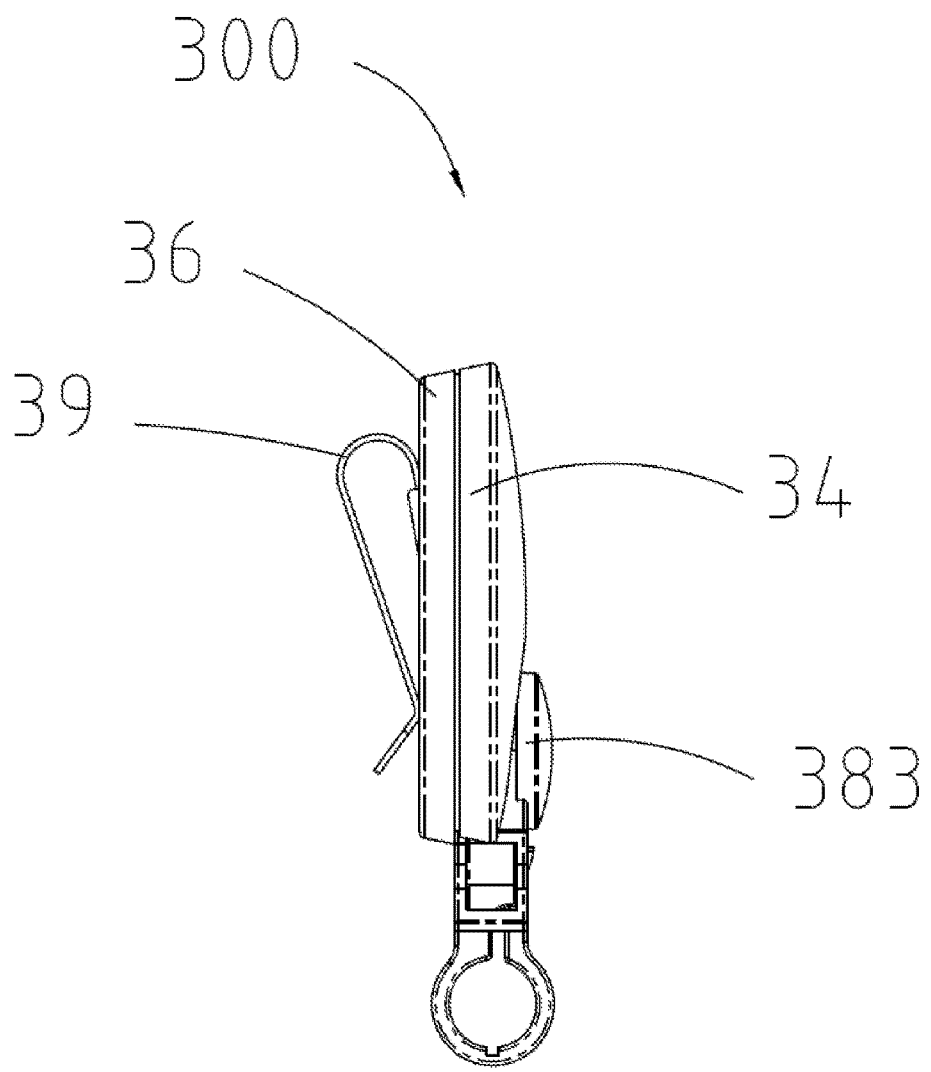
FIG. 17 is a side view of the split type hanging buckle according to the third exemplary embodiment.
Figure 18:
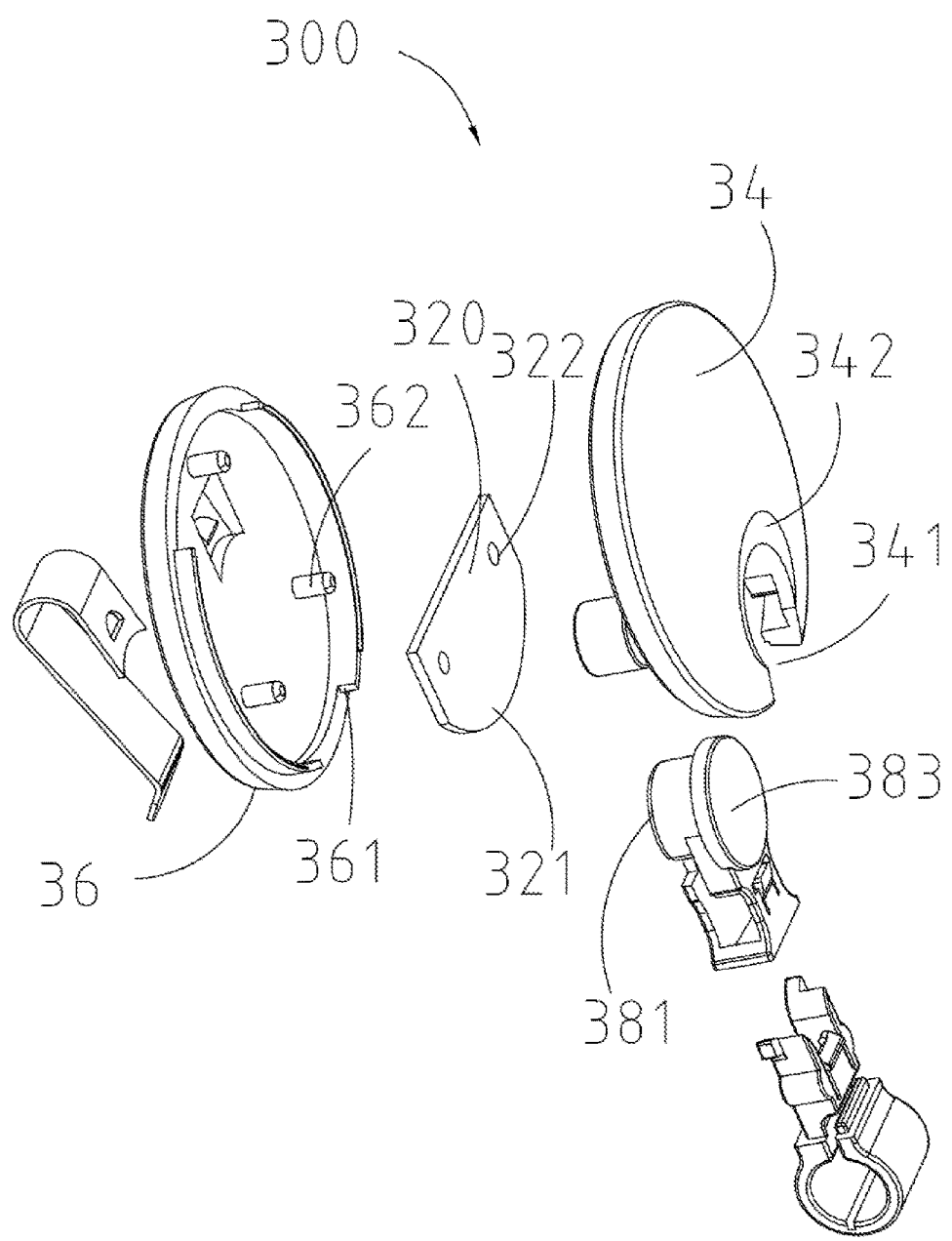
FIG. 18 is an exploded isometric view of the split type hanging buckle according to the third exemplary embodiment.
Figure 19:
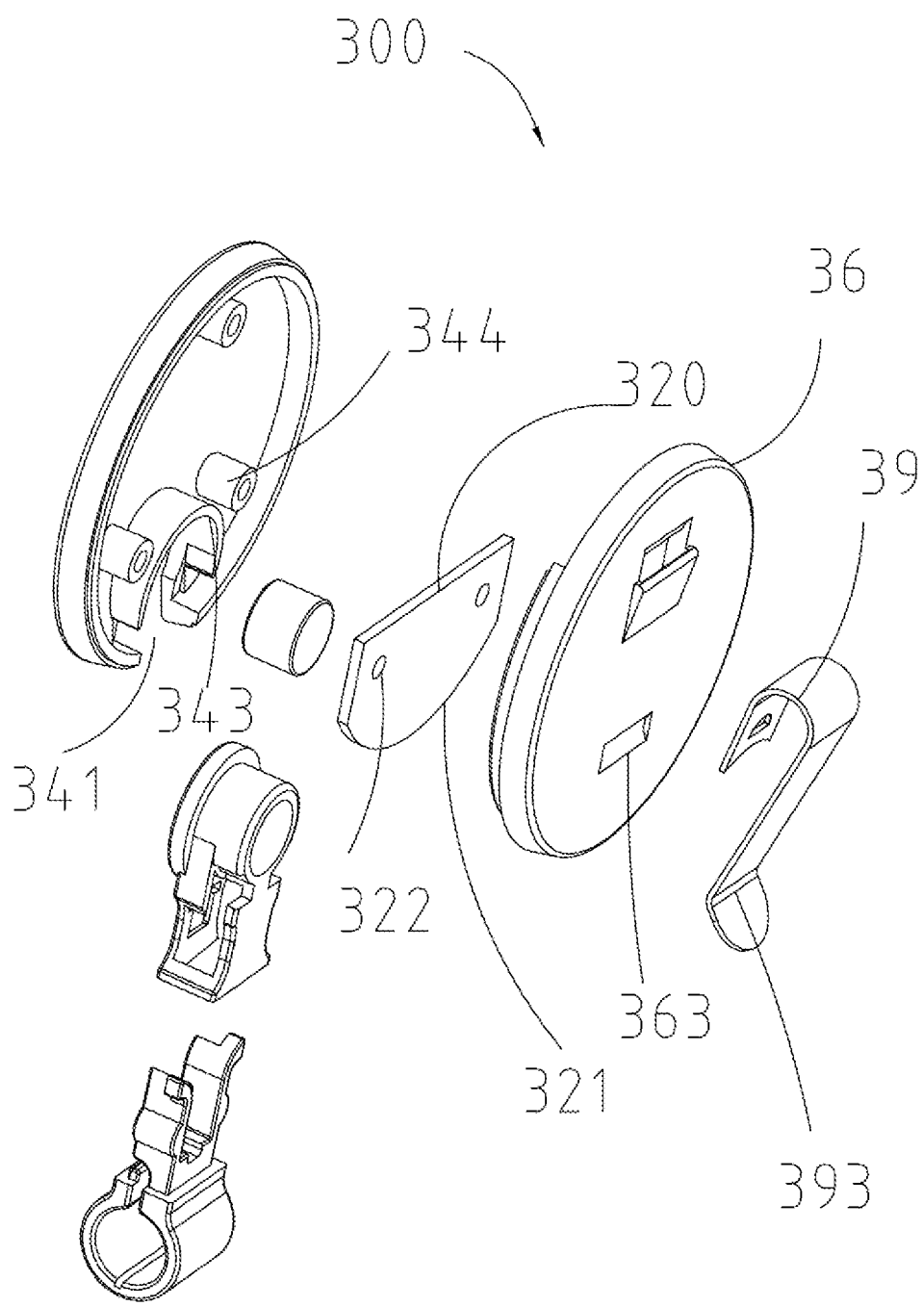
FIG. 19 is similar to FIG. 18, but shown in another view.
Figure 20:
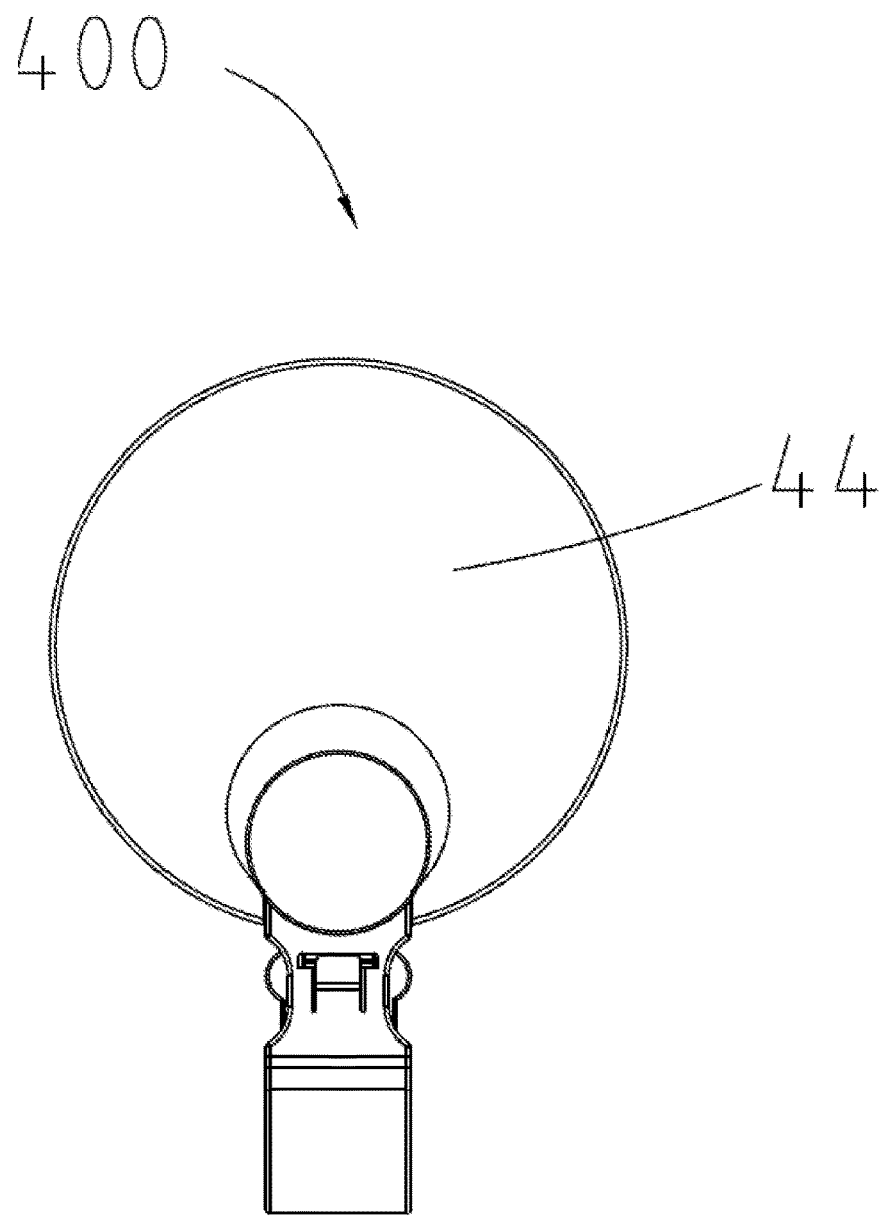
FIG. 20 is a front view of a split type hanging buckle according to a fourth exemplary embodiment.
Figure 21:
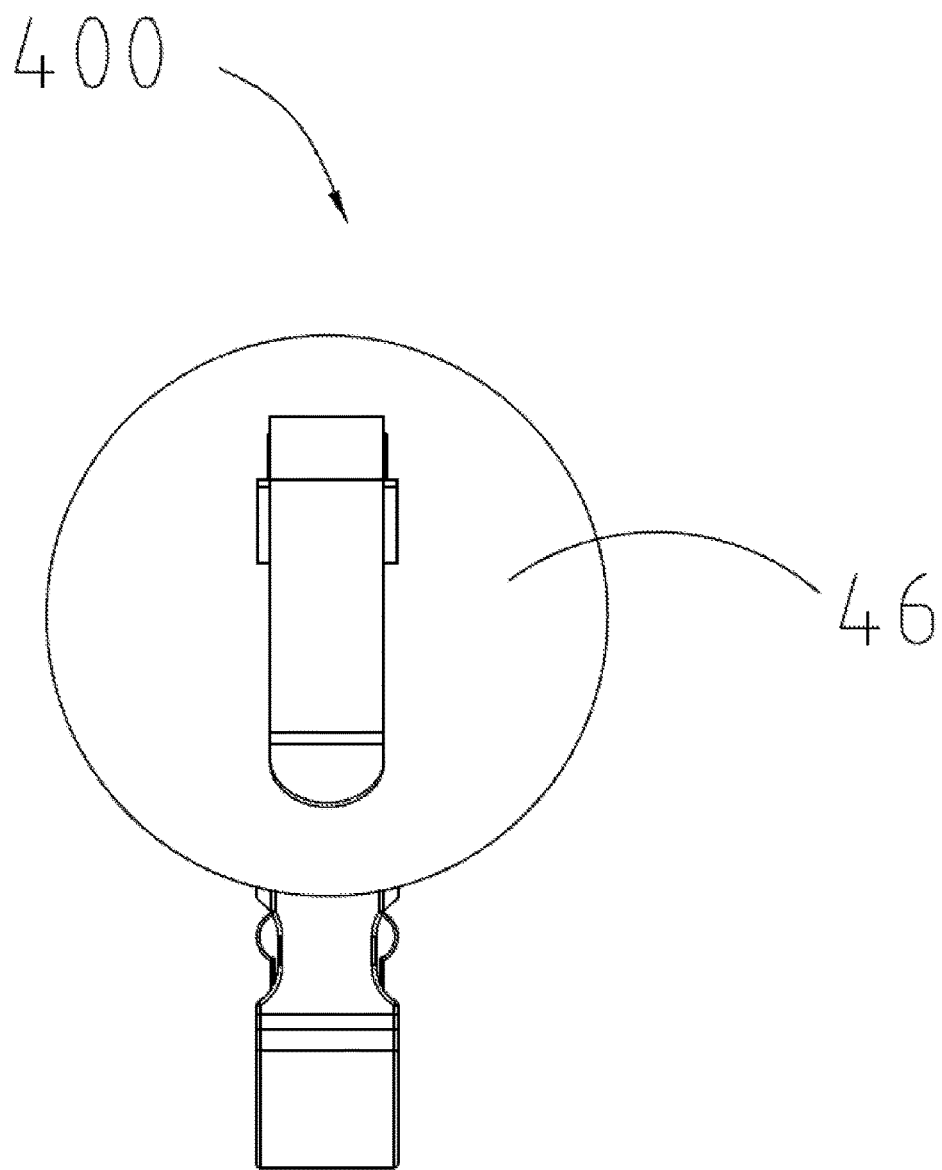
FIG. 21 is a back view of the split type hanging buckle according to the fourth exemplary embodiment.
Figure 22:
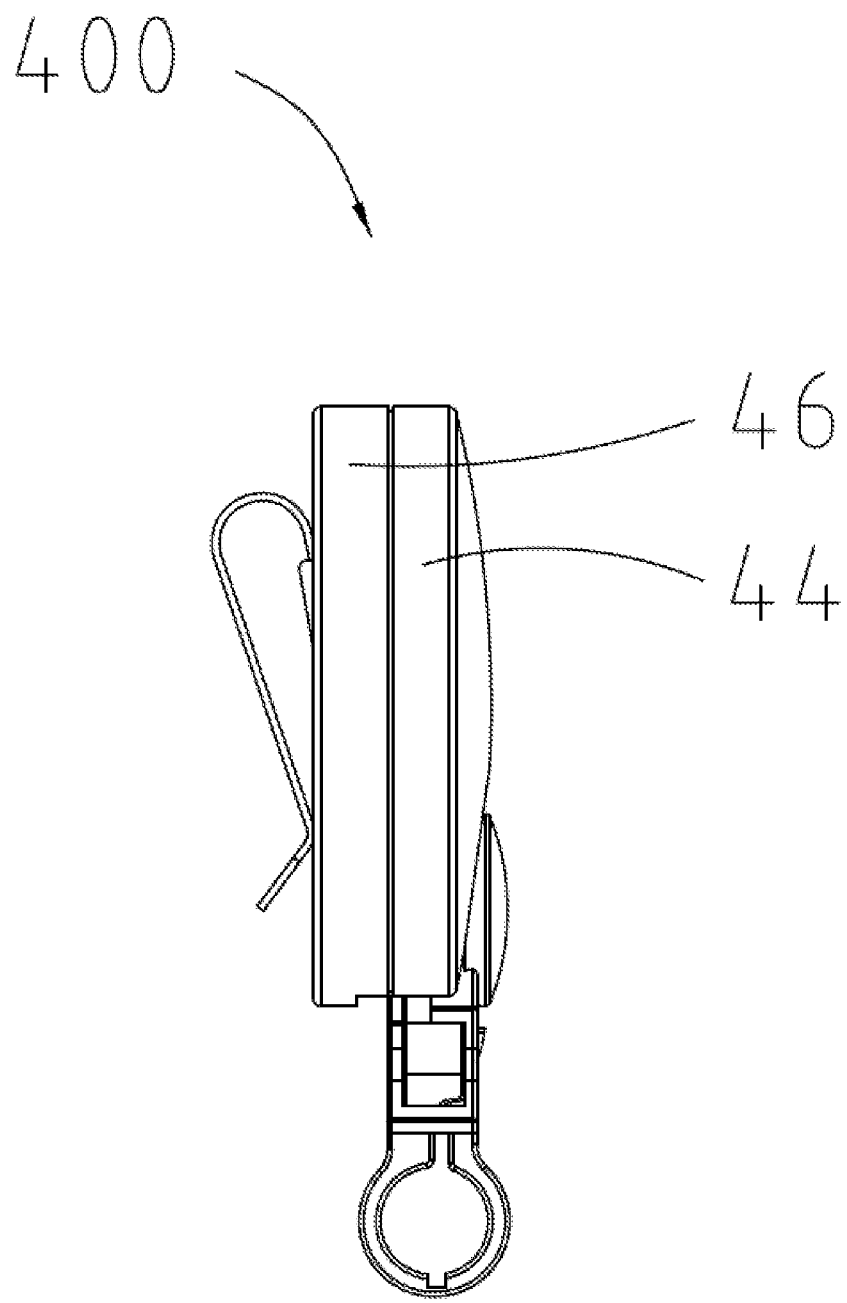
FIG. 22 is a side view of the split type hanging buckle according to the fourth exemplary embodiment.
Figure 23:
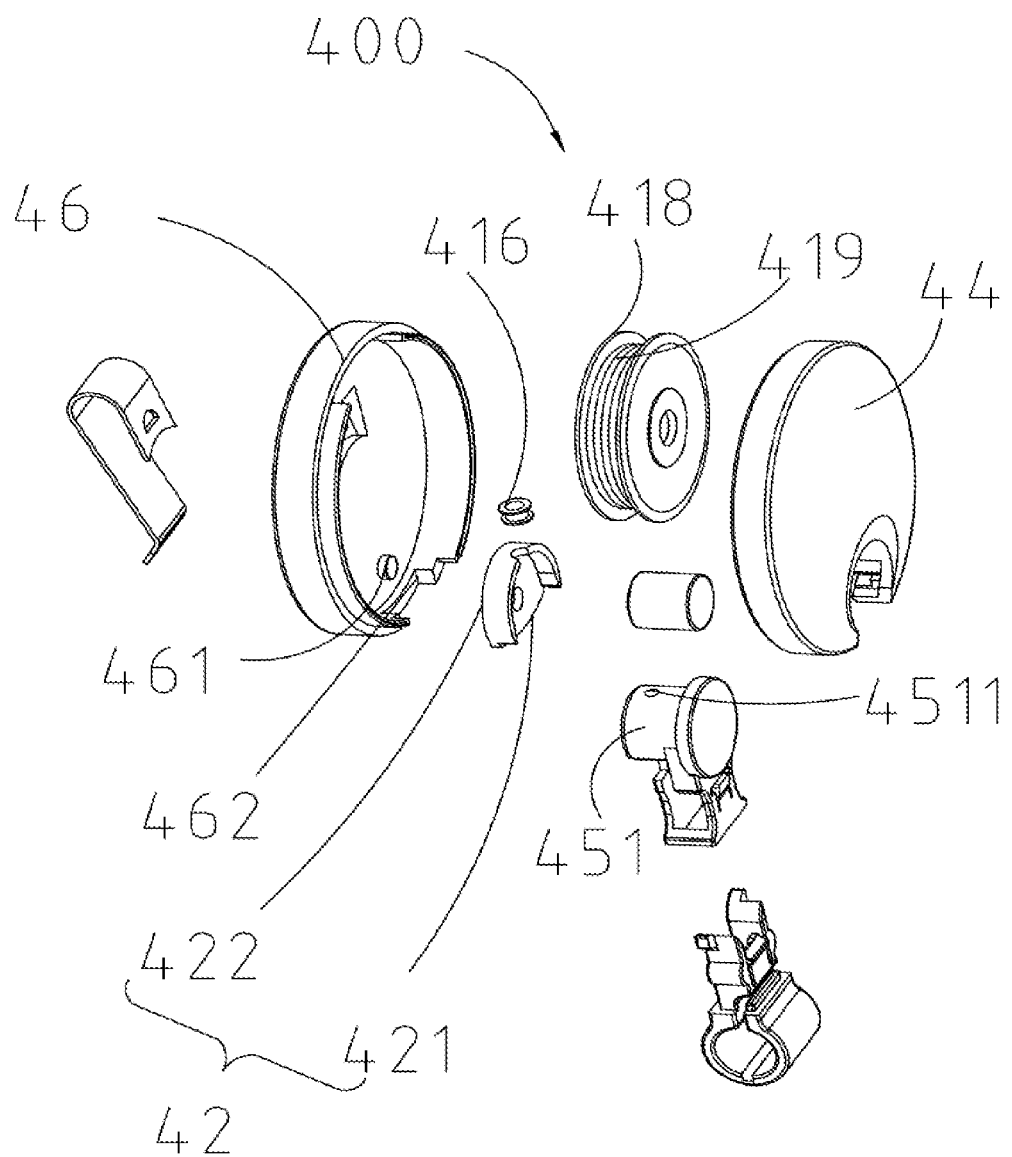
FIG. 23 is an exploded isometric view of the split type hanging buckle according to the fourth exemplary embodiment.
Figure 24:
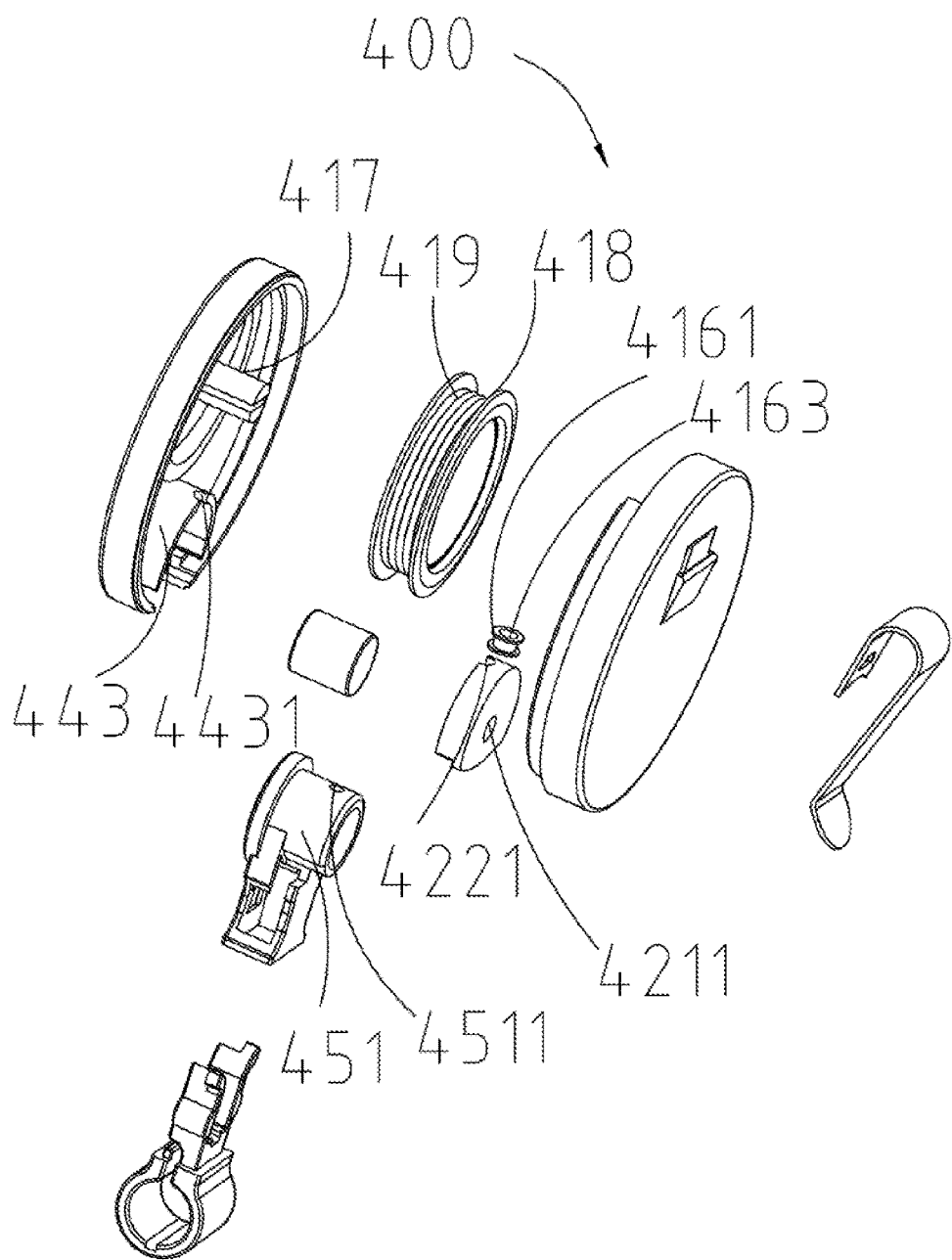
FIG. 24 is similar to FIG. 23, but shown in another view.
Figure 25:
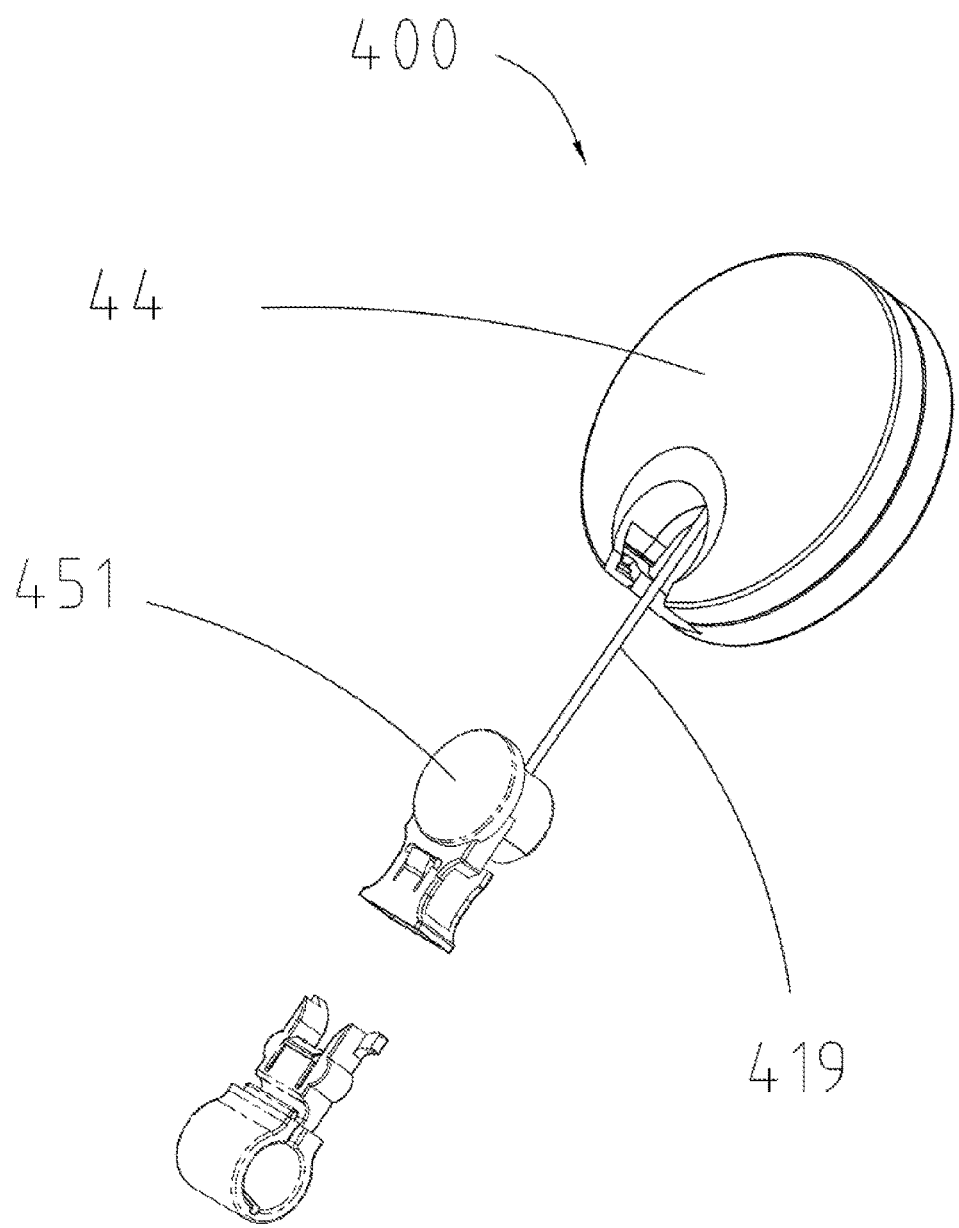
FIG. 25 is another exploded isometric view of the split type hanging buckle according to the fourth exemplary embodiment.
Figure 26:
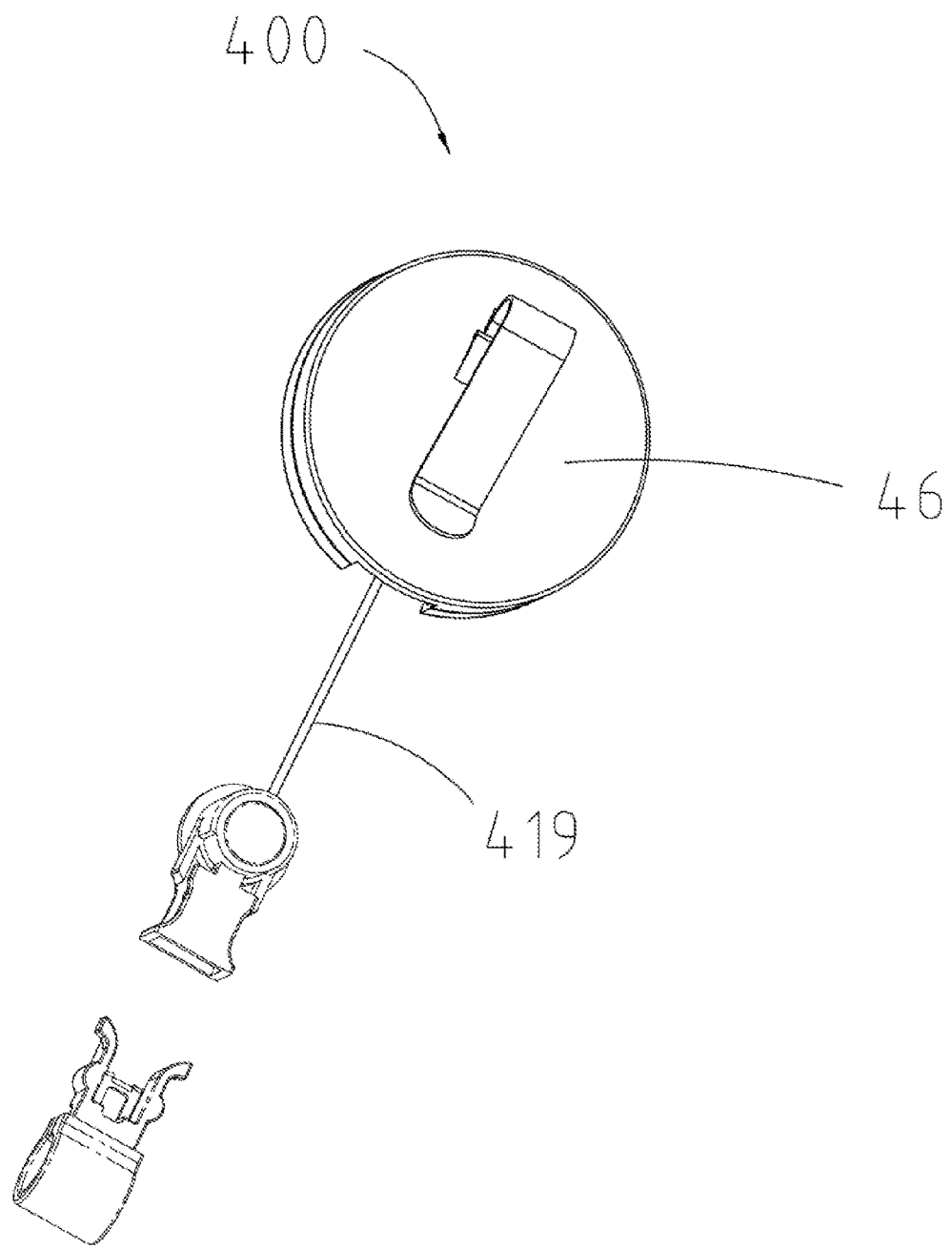
FIG. 26 is similar to FIG. 25, but shown in another view.
Figure 27:
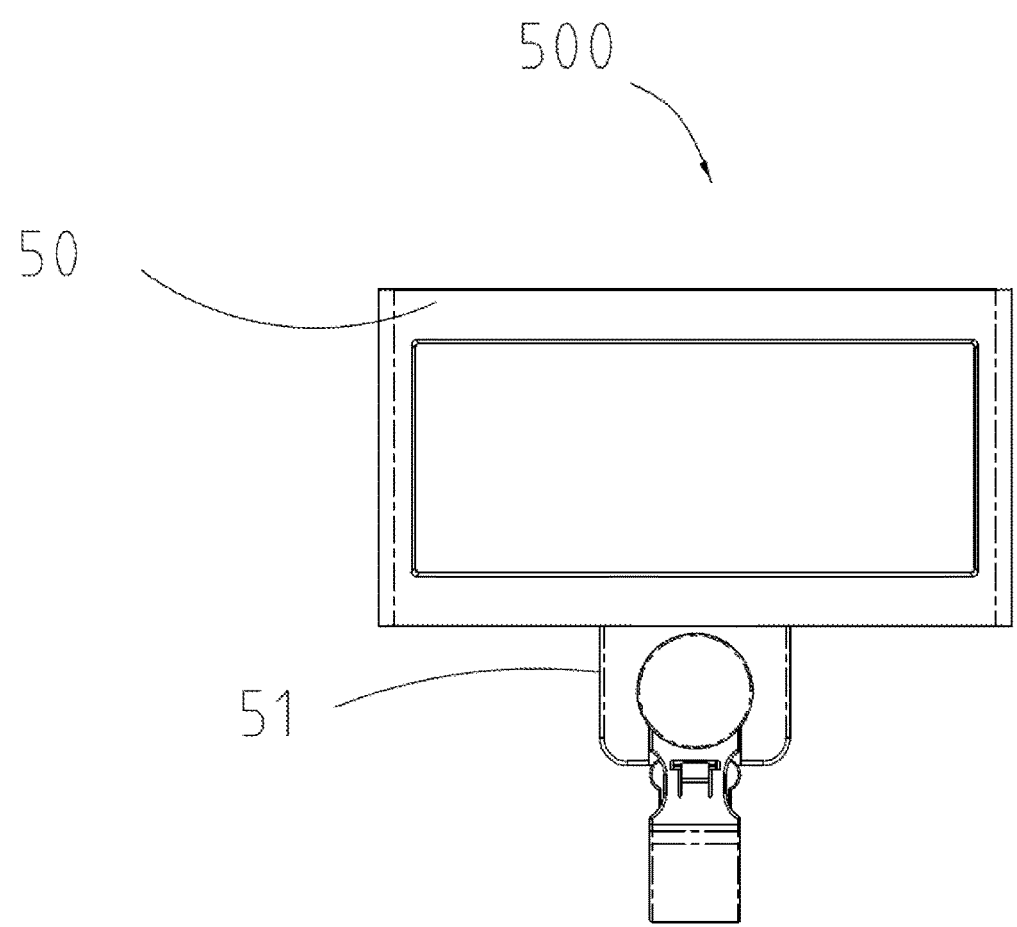
FIG. 27 is a front view of a split type hanging buckle according to a fifth exemplary embodiment.
Figure 28:
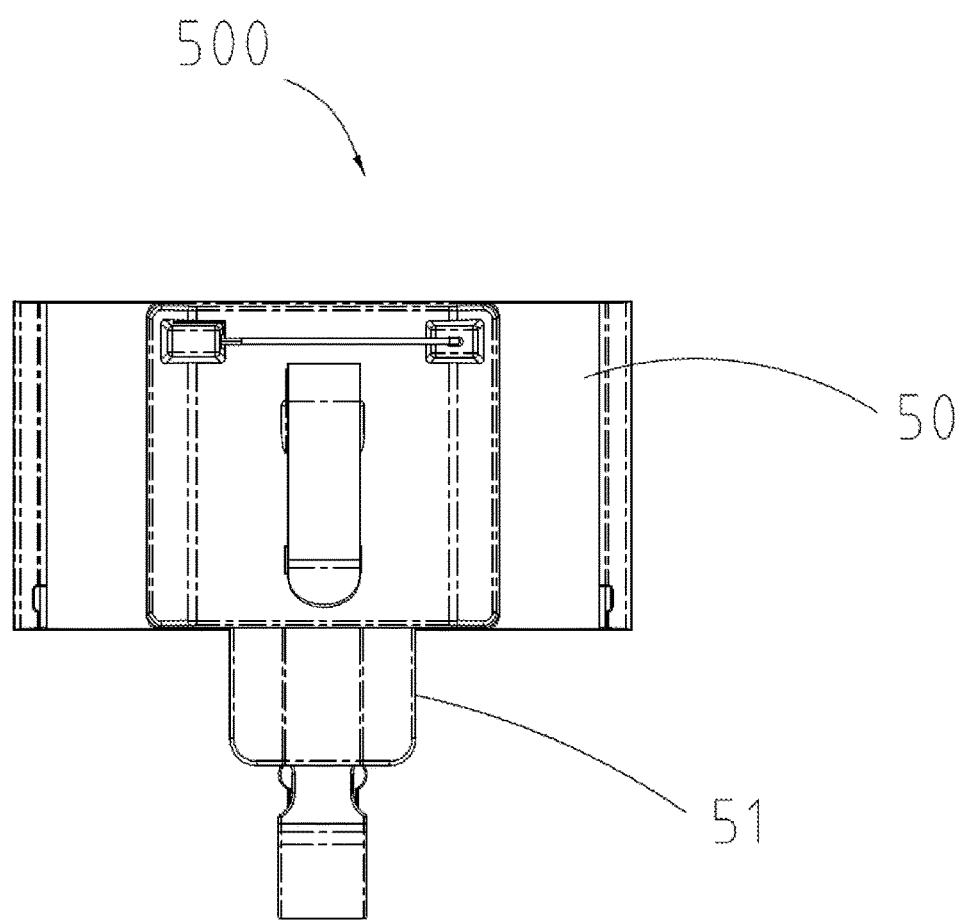
FIG. 28 is a back view of the split type hanging buckle according to the fifth exemplary embodiment.
Figure 29:
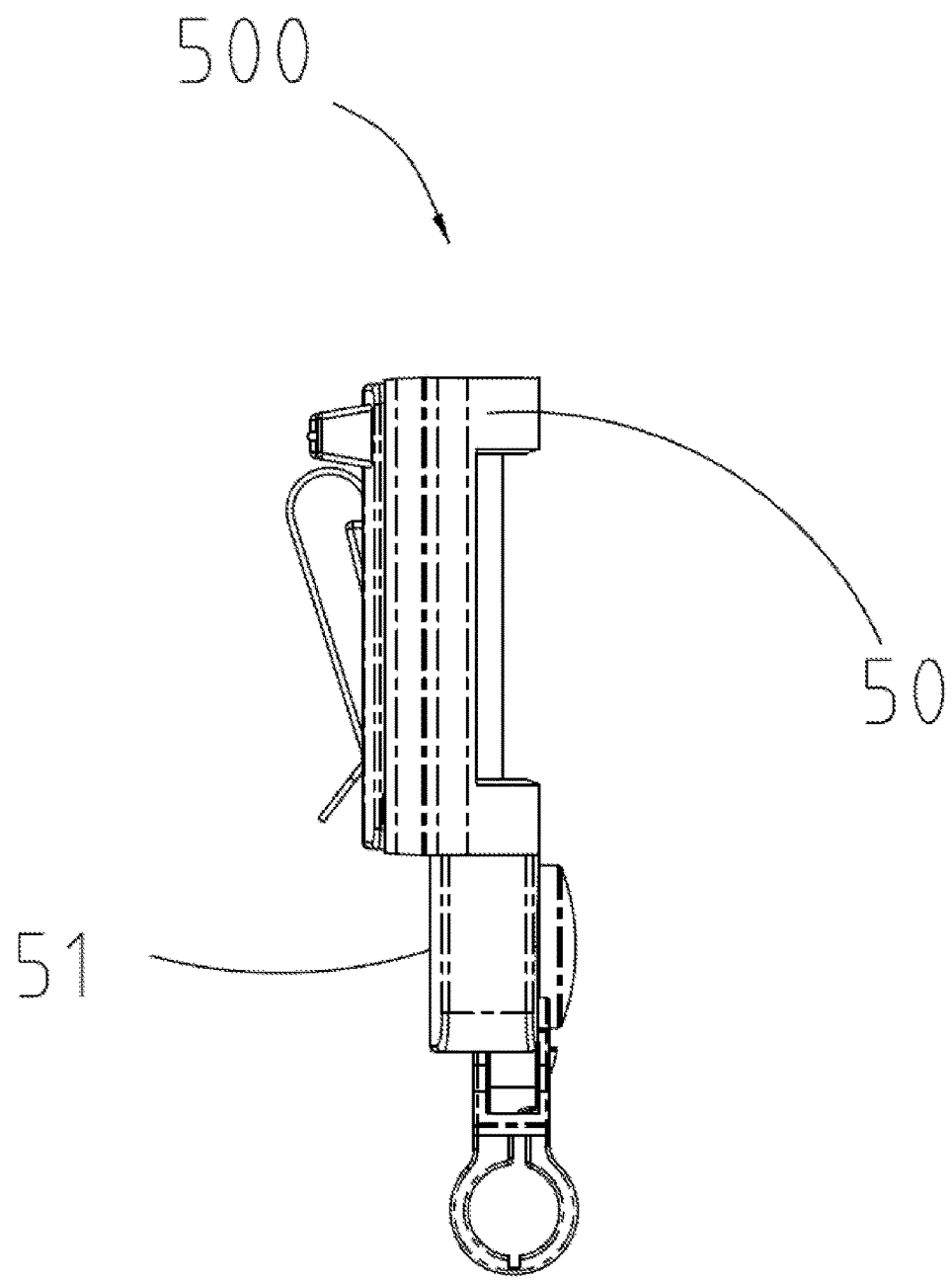
FIG. 29 is a side view of the split type hanging buckle according to the fifth exemplary embodiment.
Figure 30:
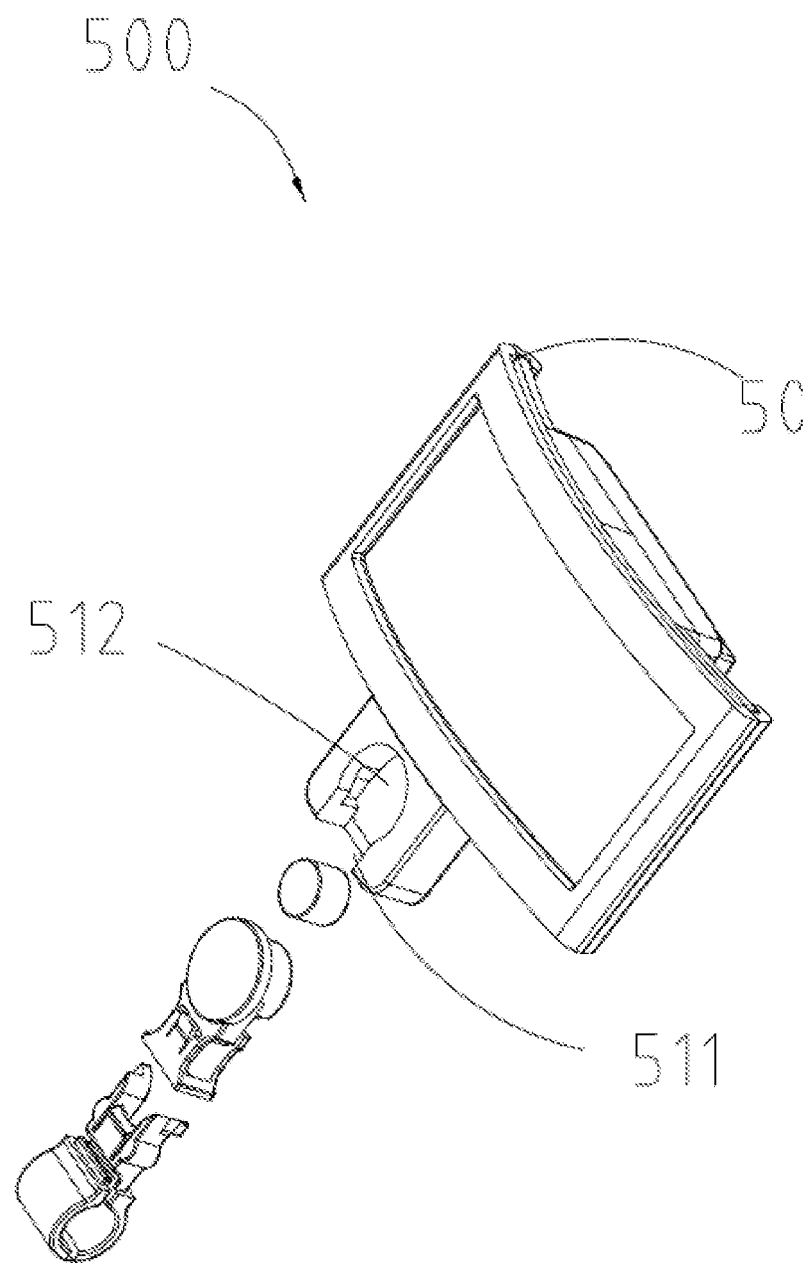
FIG. 30 is an exploded isometric view of the split type hanging buckle according to the fifth exemplary embodiment.
Figure 31:
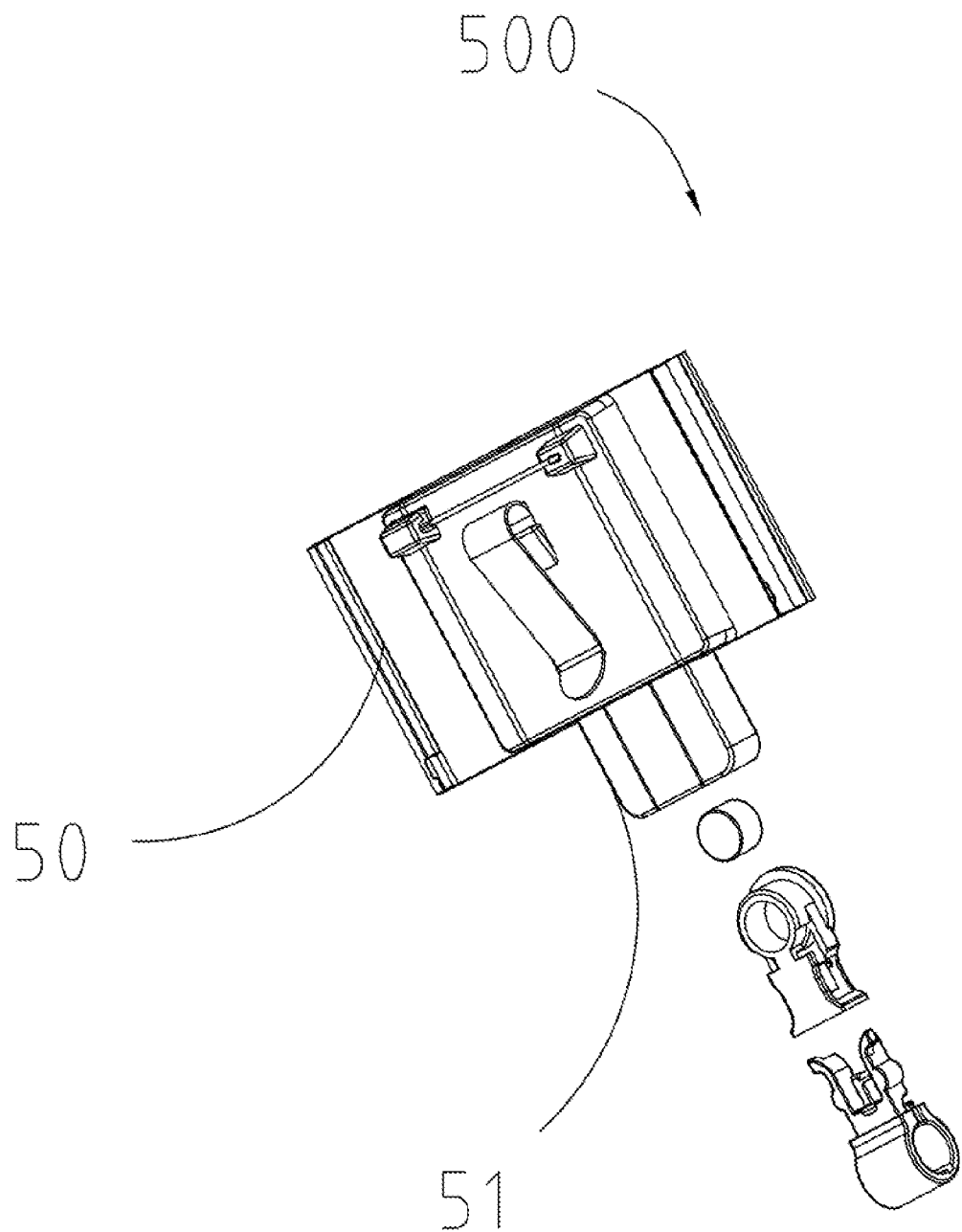
FIG. 31 is similar to FIG. 30, but shown in another view.
Figure 32:
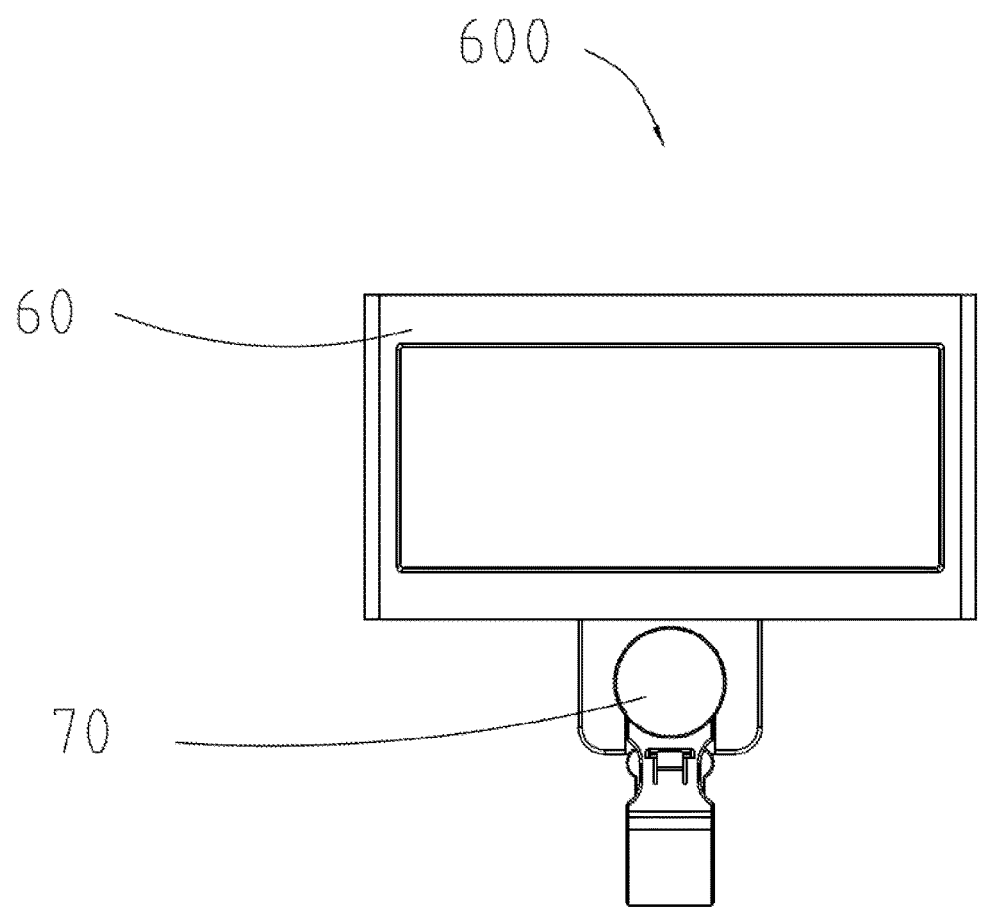
FIG. 32 is a front view of a split type hanging buckle according to a sixth exemplary embodiment.
Figure 33:
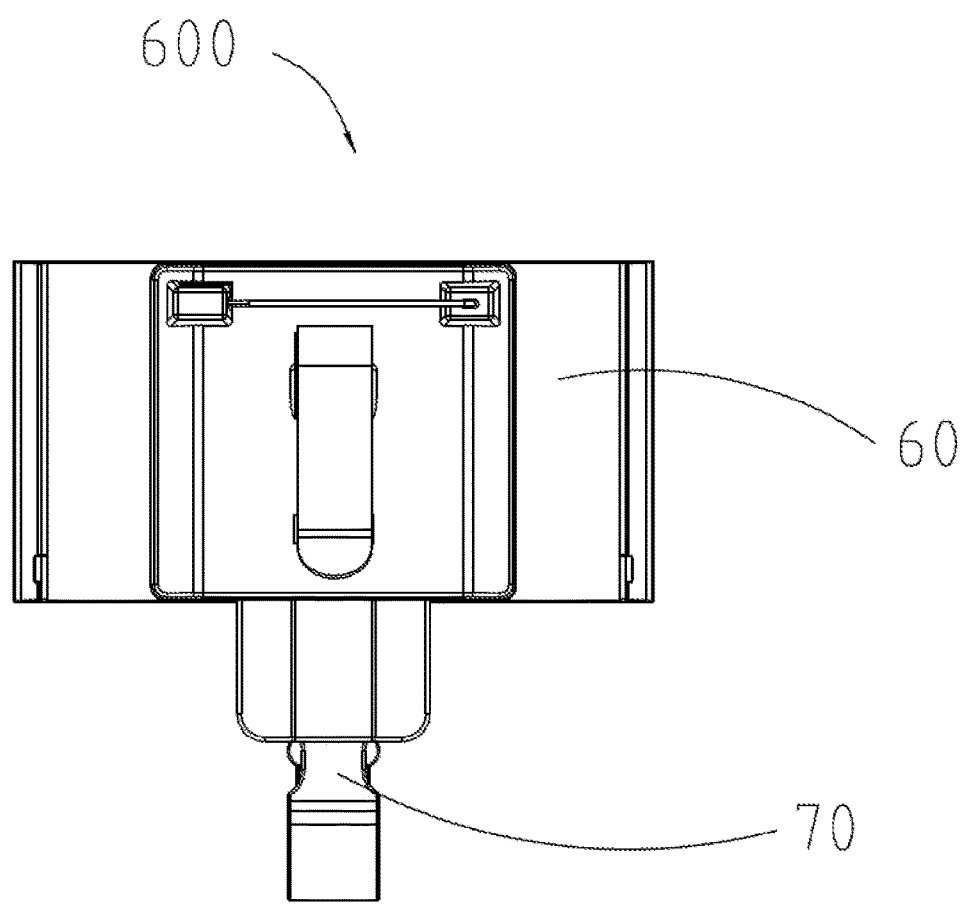
FIG. 33 is a back view of the split type hanging buckle according to the sixth exemplary embodiment.
Figure 34:
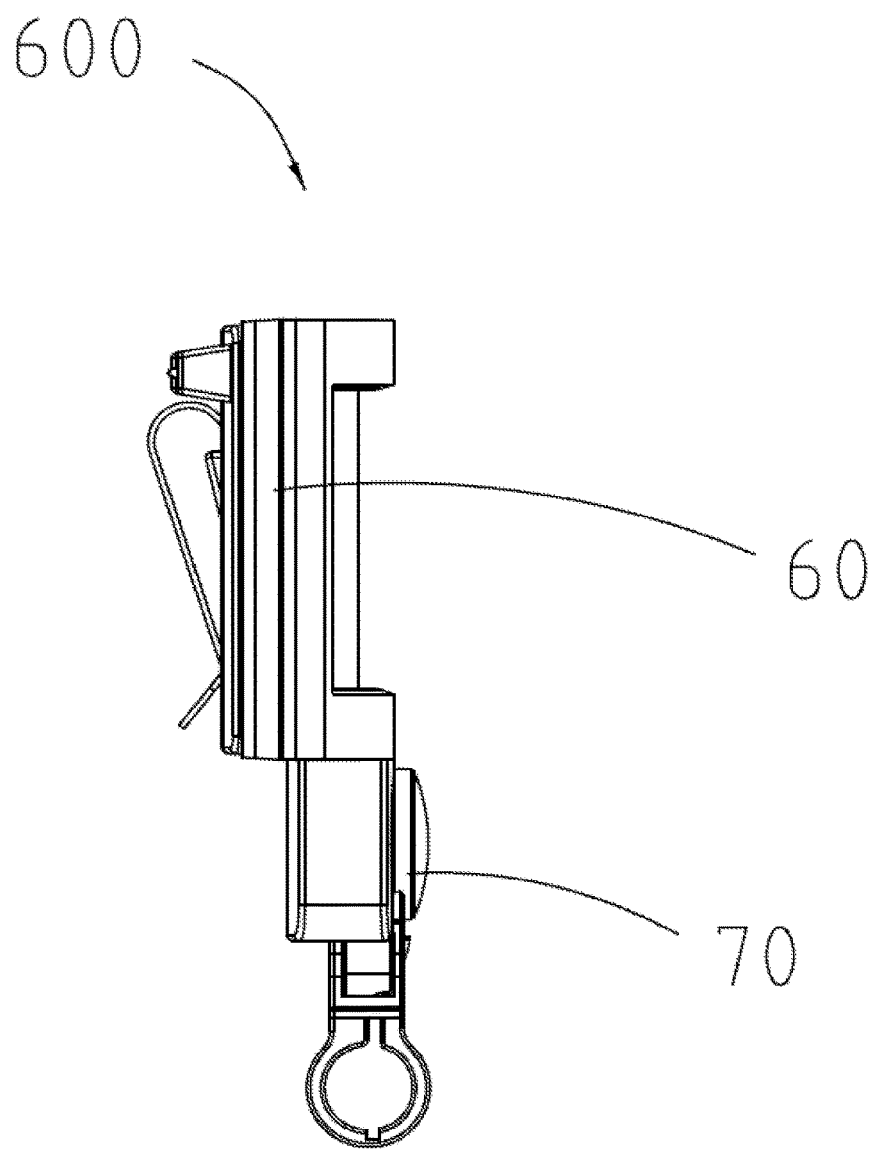
FIG. 34 is a side view of the split type hanging buckle according to the sixth exemplary embodiment.
Figure 35:
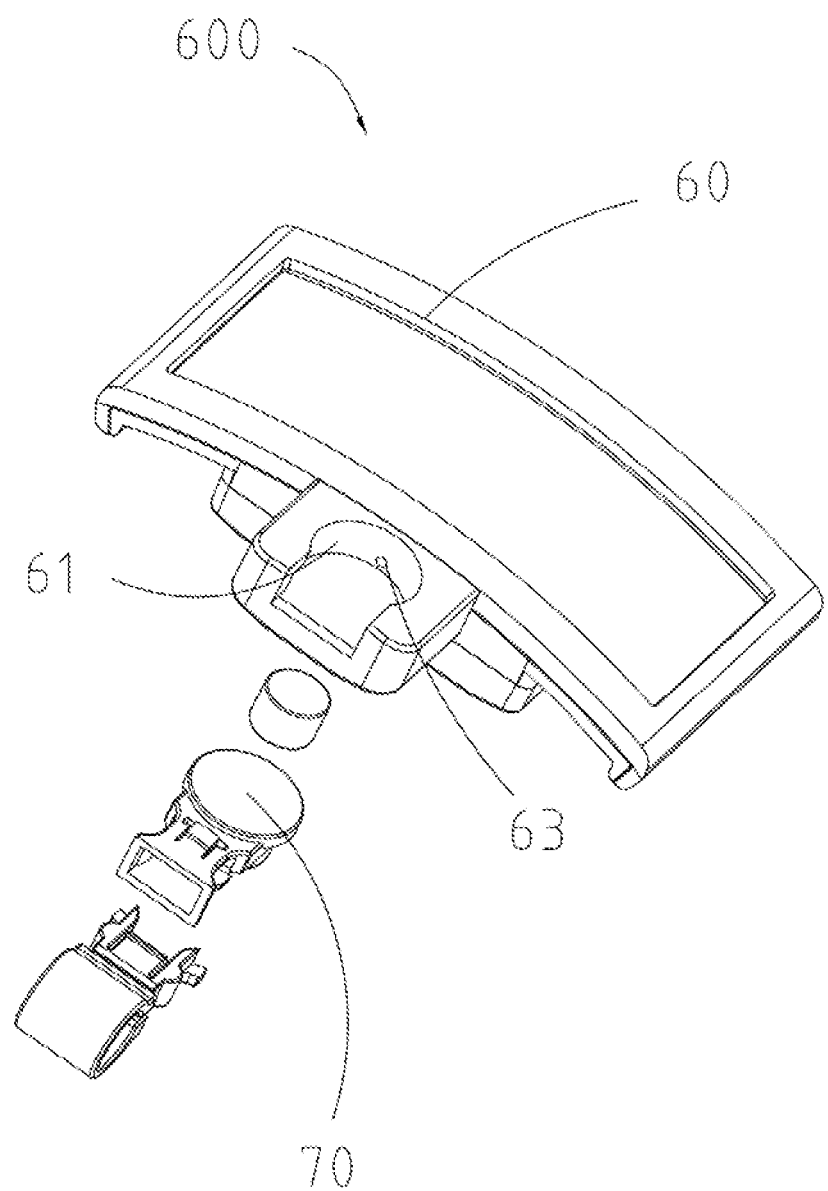
FIG. 35 is an exploded isometric view of the split type hanging buckle according to the sixth exemplary embodiment.
Figure 36:
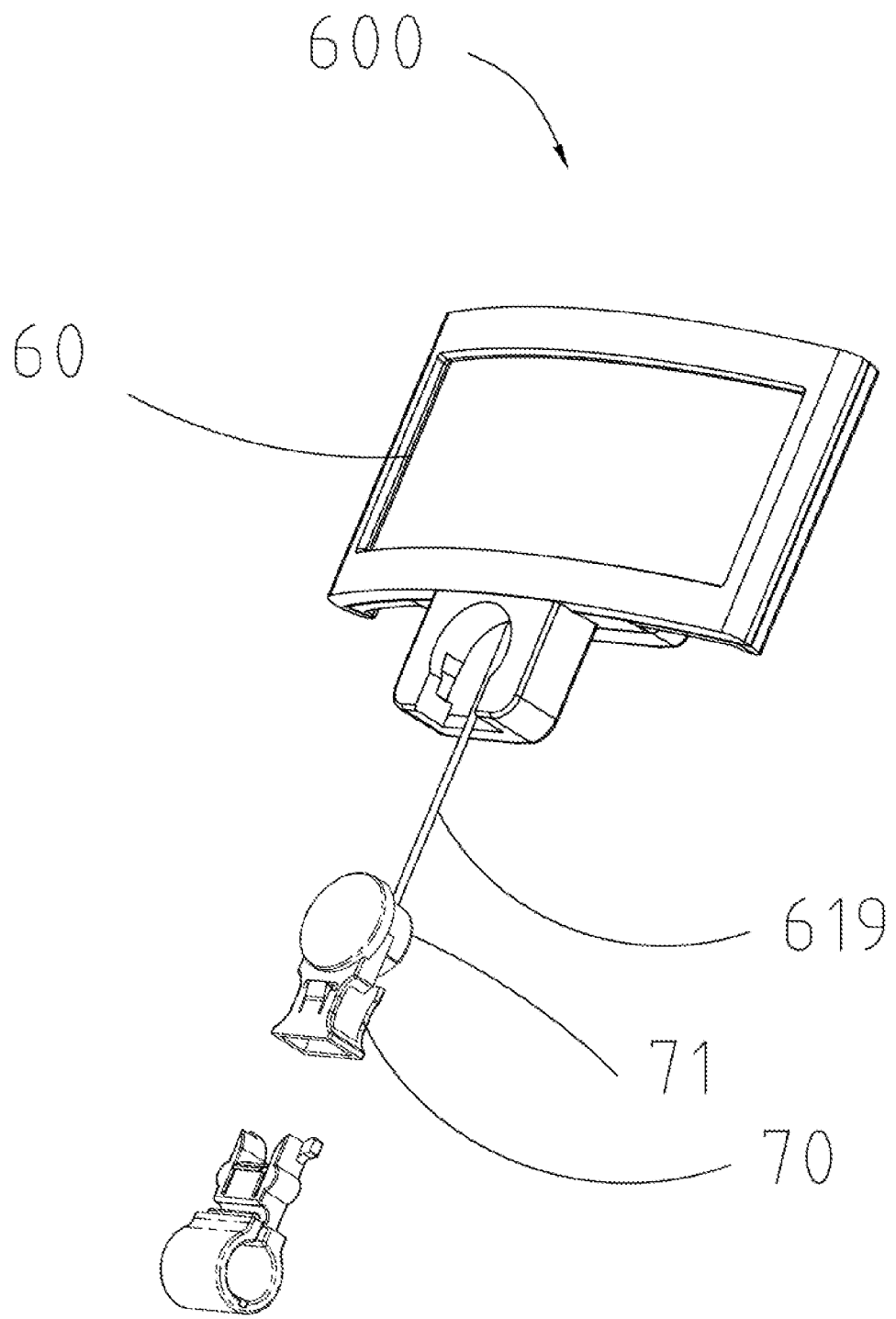
FIG. 36 is another exploded isometric view of the split type hanging buckle according to the sixth exemplary embodiment.
Figure 37:
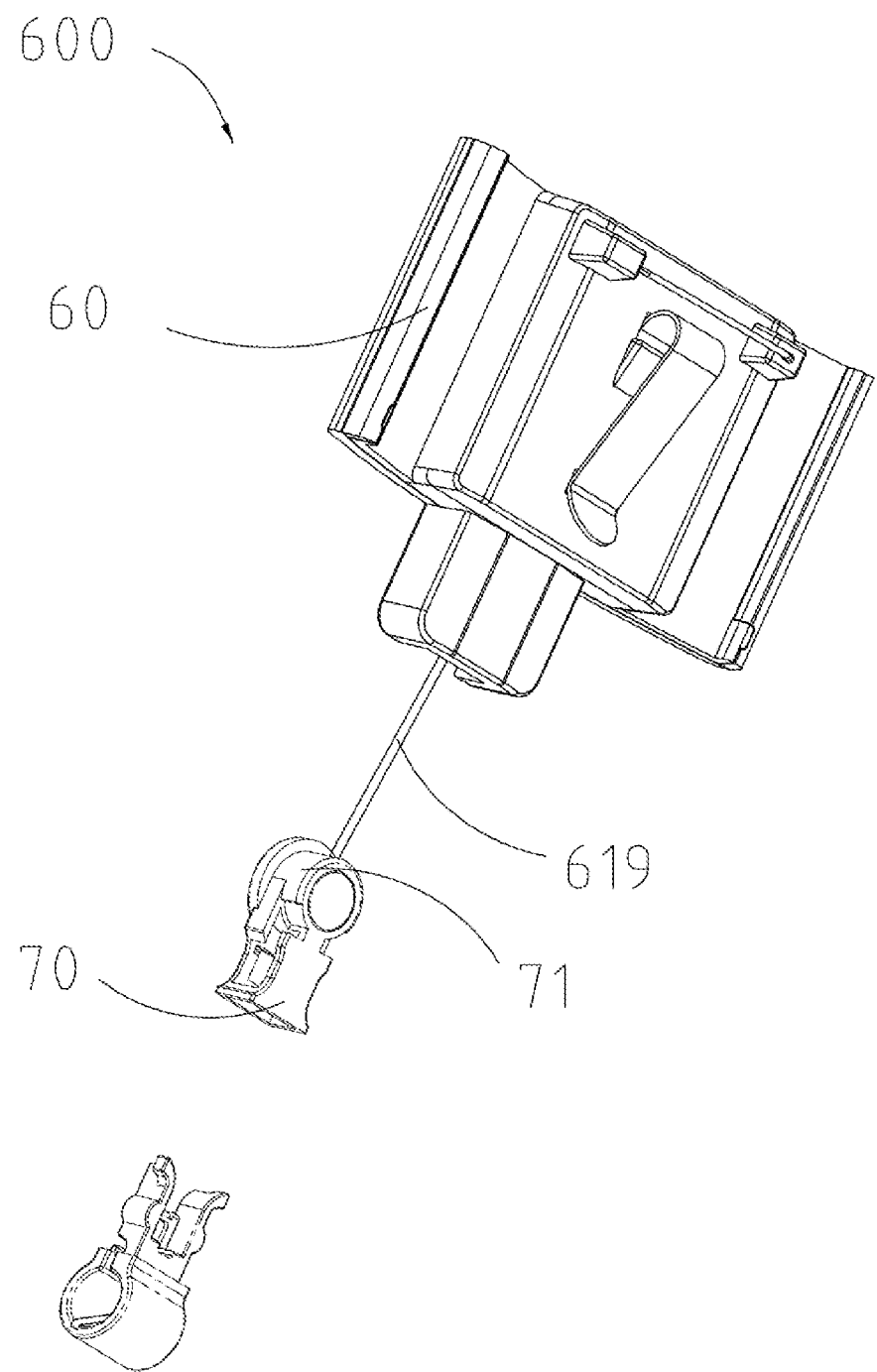
FIG. 37 is similar to FIG. 36, but shown in another view.

With reference to FIGS. 1-37, a plurality of split type hanging buckles are provided, and the split of hanging buckles can be used to hang keys, ID card, mobile phone, pen, various kinds of gadgets, and so on.

With reference to FIGS. 1-7, a split type hanging buckle 100 according to the first exemplary embodiment includes a base 10 and a connecting element 30. The base 10 is connected with the connecting element 30.

The base 10 includes a top cover 11, a bottom cover 13 covered by the top cover 11, and a clip 15 connected with the bottom cover 13.

The top cover 11 includes a receiving groove 111, a displaying window 113, a first hook 115 and a supporter 117.

The receiving groove 111 is located at one end of the top cover 11 closing to the connecting element 30, and the receiving groove 111 can be used to receive the connecting element 30. Two opposite sidewalls of the receiving groove 111 have two opposite stops 1111.

The displaying window 113 is formed on one side of the top cover 11, and the displaying window 113 can be used to place label or anything else.

An opposite side of the top cover 11 has a groove 112, a surface of the bottom cover 13 opposite to the top cover 11 also has a groove 133, the groove 112 and the groove 133 cooperatively form a receiving space.

One end of the bottom top 13 closing to the connecting element 30 has an accommodating groove 131, the accommodating groove 131 is corresponding to the receiving groove 111. An engaging element 135 is located at the groove 133, one end of the engaging element 135 has an opening 1351, a bottom surface of the engaging element 135 further has a fitting element 1353. One end of the clip 15 has a fitting hole 151, the end of the clip 15 having the fitting hole 151 can pass through the opening 1351, such that the fitting element 1353 can be fitted in the fitting hole 151, and the clip 15 can be connected with the bottom cover 13. An opposite end of the clip 15 has a bending part 153, the bending part 153 is resisting on the surface of the bottom cover 13.

It is to be understood that, the clip 15 can also be a clamp, a pin and so on.

The bottom cover 13 further includes a second hook 137 corresponding to the first hook 115.

The connecting element 30 include a first magnetic element 31, a second magnetic element 33 interacting with the first magnetic element 31, a connecting part 35 and a fitting part 37.

The first magnetic element 31 and the second magnetic element 33 can be made of magnet, or various kinds of metals which can attract magnet, and so on. In detail, the first magnetic element 31 and the second magnetic element 33 can be magnet; the first magnetic element 31 can be magnet, and the second magnetic element 33 can be metal which can attract magnet; or the second magnetic element 33 can be magnet, the first magnetic element 31 can be metal which can attract magnet. The first magnetic element 31 and the second magnetic element 33 can have cylindrical structures.

The first magnetic element 31 can be received in the accommodating groove 131.

One end of the connecting part 35 has an inserting part 351, a clamping had 353, a diameter of the clamping had 353 is bigger than a diameter of the inserting part 351, and the inserting part 351 is located at a surface of the clamping part 353.

One end of the inserting part 351 far away from the clamping part 353 has a receiving cavity 3511, the second magnetic element 33 can be received in the receiving cavity 3511, and after the second magnet element 33 is received in the receiving cavity 3511, portions of the second magnetic element 33 away from the inserting part 351 can attract the first magnet element 31, such that the connecting element 30 can be connected with the base 10.

The inserting part 351 can be received in the receiving groove 111. One end of the connecting part 35 away from the inserting part 351 has an accommodating cavity 3513, the accommodating cavity 3513 has three openings, the three opening openings can be two opposite side openings 3515 and a bottom opening 3517 located between the two side openings 3515. A side wall of the accommodating cavity 3513 further has an elastic element 355. A periphery of the elastic element 355 has through slot, such that the elastic element 355 can be pressed along a direction perpendicular to an axis of the connecting part 35.

One end of the fitting part 37 to the connecting part 35 has two opposite pressing plates 371, one end of each pressing plate 371 has a bulge 3711, the bulges 3711 corresponding to the stops 1111. It is to be understood that, the bulges 3711 can be fitted on corresponding stops 1111, such that the connecting element 30 can be connected with the base 10.

A middle part of each pressing plate 371 further has a lug 3713. A clamping element 375 can be located between the two pressing plates 371, and one surface of the clamping element 375 has a flanging element 3751, when the fitting part 37 is received in the accommodating cavity 3513, the flanging element 3751 can resist the elastic element 355, such that the fitting part 37 can be clamped in the connecting part 35. When the fitting part 37 is received in the accommodating cavity 3513 of the connecting part 35, user can press the elastic element 355, and then release the elastic element 355, such that the elastic element 355 can rebounds back, and the clamping element 375 can be separated from the elastic element 355. When the fitting part 37 is pushed along a direction of away from the base 10, and the bulges 3711 can move to a bottom of the accommodating cavity 3513, the bulges 3711 are stopped by two opposite limiting elements 3519, such that the fitting part 37 cannot continue moving along the direction of away from the base 10, and the fitting part 37 can be connected with the connecting part 35 through the bulges 3711 and the limiting elements 3519. The two opposite limiting elements 3519 are formed on two opposite sides of the end of the connecting part closing to the fitting part 37. An opposite end of the fitting part 37 has a connecting member 373, a middle area of the connecting member 373 has a receiving hole 3731, the receiving hole 3731 can be a through hole, one end of the connecting member 373 has a switch 3733, the switch 3733 can close or open the connecting member 373, such that objects, such as pens, keys, name tag, small tools, mobile phone, ID card, can be received in the receiving hole 3731 through the switch 3733, such that the objects can be connected with the fitting part 37. It is to be understood that, the objects can also be separated from the fitting part 37 through the switch 3733. An inner surface of the connecting member 373 further has a slot 3735, the slot 3735 can extend along an axis of the connecting member 373, and the slot 3735 insures that the switch 3733 open or lock the fitting part 37 much smoothly. Furthermore, the slots 3735 also can ensure that a using life of the connecting member 373 is increased.

When the hanging buckle 100 is assembled, the first magnetic element 31 is received in the accommodating groove 131. The top cover 11 covers the bottom cover 13, the clip 15 is connected with the bottom cover 13 through the fitting hole 151 and engaging element 135. The second magnetic element 33 is received in the receiving cavity 3511 of the inserting part 351, user presses the two pressing plates 371 towards opposite directions, and pushes the fitting part 37 to pass through the bottom opening 3517 and move towards the base 10, when the fitting part 37 passes through the side openings 3715, the bulges 3711 and the lugs 3713 can pass through the side openings 3515 respectively, and the lugs 3713 and the bulges 3711 can be exposed from the side openings 3515 respectively, and the flanging element 3751 of the clamping part 375 can resist and press the elastic element 355, such that the fitting part 37 can be connected with the connecting part 35, and the connecting part 37 can move towards the base 10 simultaneously with the fitting part 37 until the bulges 3711 are fitted on the stops 1111. It is to be understood that, a top surface of the clamping element 375 can resist a bottom surface of the inserting part 351, such that the connecting part 37 can move towards the base 10 simultaneously with the fitting part 37 until the bulges 3711 are fitted on the stops 1111. The bulges 3711 can move perpendicular to an axis of the base 10 to be locked on the stops 1111 when user stops pressing the pressing plates 371, such that the connecting element 30 can be firmly connected with the base 10. At this time, the lugs 3713 are exposed from the side openings 3515 respectively, the clamping element 375 is clamped with the elastic element 355 and presses the elastic element 355, the inserting part 351 is received in the receiving groove 111, the second magnetic element 33 faces and attracts the first magnetic element 31, such that connecting element 30 is connected with the base 10.

When the hanging buckle 100 is disassembled, user presses the two pressing plates 371 towards opposite directions, the pressing plates 371 move towards each other, such that the bulges 3711 can release from the stops 1111, and the lugs 3715 also move towards each that to pass through the side openings 3515 and received in the accommodating cavity 3513, the fitting part 37 is pulled to move away from the base 10, as the clamping element 375 still resists and presses the elastic element 355, the connected part 35 is driven to move away from the base 10 by the fitting part 37, such that the fitting part 37, the connecting part 35 and the second magnetic element 33 can be separated from the base 10 and the first magnetic element 31. User can press the elastic element 355 towards a middle of the connecting part 35 and release the elastic element 355, the flanging element 3751 of the clamping element 375 can be separated from the elastic element 355, then the fitting part 37 is continued to be pulled to move away from the connecting part 35, when the bulges 3711 move to a bottom of the accommodating cavity 3513, the bulges 3711 can be stopped by the two limiting elements 3519 respectively, such that the moving of the fitting part 37 can be stopped, and the fitting part 37 can be connected with the connecting part 35 through the limiting element 3519 and the bulges 3711.

Referring to FIGS. 8-14, differences between a split type hanging buckle 200 according to a second exemplary embodiment and the split type hanging buckle 100 according to the first exemplary embodiment includes: a coil brace 218 is arranged around a supporter 217 of the split type hanging buckle 200, the coil brace 218 is coiled with a coil 219, one end of the coil 219 can pass through a hole 2511 of an inserting part 251 to be received in the inserting part 251, and parts of the coil 219 exposed from the hole 2511 of the inserting part 251 can be connected with the inserting part 251, such that a base 20 of the split type hanging buckle 200 according to the second exemplary embodiment can also be connected with a connecting element through the coil 219.

The other properties of the split type hanging buckle 200 according to the second exemplary embodiment are the same with the split type hanging buckle 100 according to the first exemplary embodiment, and no more tautology here.

An assembly process of the split type hanging buckle 200 is slightly different from the assembly process of the split type hanging buckle 100, such as: the coil 219 coils around the coil brace 218, and the coil brace 218 is arranged around the supporter 217, one end of the coil 219 passes through the hole 2511 and is received in the inserting part 251.

A disassemble process of the split type hanging buckle 200 is slightly different from the disassemble process of the split type hanging buckle 100, such as: user pulls a fitting part of the split type hanging buckle to move away from the coil brace 218, such that the coil 219 extends away from the coil brace 218, when user stops pulling the fitting part, the coil 219 can bounce back automatically to bring the connecting element to be connected with the base 20 automatically.

The other properties of the assembly process of the split type hanging buckle 200 according to the second exemplary embodiment are the same with the assembly process of the split type hanging buckle 100 according to the first exemplary embodiment, and no more tautology here.

The other properties of the disassemble process of the split type hanging buckle 200 according to the second exemplary embodiment are the same with the disassemble process of the split type hanging buckle 100 according to the first exemplary embodiment, and no more tautology here.

Referring to FIGS. 15-19, differences between a split type hanging buckle 300 according to a second exemplary embodiment and the split type hanging buckle 100 according to the first exemplary embodiment includes: a first magnetic element 320 can be substantially a plate structure, one end of the first magnetic element 320 has a curved protrusion 321. One end of a bottom cover 36 has an accommodating groove 361, the accommodating groove 361 corresponds to the curved protrusion 321, and the protrusion 321 can be received in the accommodating groove 361. One surface of the bottom cover 36 facing a clip 39 has a groove 363, the groove 363 is used to receive a bending part 393 of the clip 39, such that the clip 39 can be connected firmly with the bottom cover 36. One end of a top cover 34 has a receiving groove 341, a periphery of the receiving groove 341 further forms a limiting groove 342, the limiting groove 342 is used to receive a clamping part 383, the receiving groove 341 is used to receive an inserting part 381. One surface of the top cover 34 facing the bottom cover 36 has a curved shielding element 343, the shielding element 343 is arranged around the receiving groove 341. Two posts 344 can be formed on the top cover 34, the posts 344 corresponds to the first magnetic element 320. The inserting part 381 is received in the receiving groove 341, and the shielding element 343 covers the inserting part 381. Two posts 344 are formed on the top cover 34, and the post 344 resist the first magnetic element 320, such that the first magnetic element 320 can be firmly located between the top cover 34 and the bottom cover 36.

It is to be understood that, the first magnetic element 320 can be connected with the bottom cover 36 through fixing holes 322 formed on the first magnetic element 320 and fixing posts 362 formed on the bottom cover 36. Furthermore, the posts 344 also resist the first magnetic element 320, such that, the first magnetic 320 can be firmly located between the top cover 34 and the bottom cover 36.

It is to be understood that, the split type hanging buckle 300 according to the third exemplary embodiment can also has a clip.

The other properties of the split type hanging buckle 300 according to the third exemplary embodiment are the same with the split type hanging buckle 100 according to the first exemplary embodiment, and no more tautology here.

An assembly process of the split type hanging buckle 300 is slightly different from the assembly process of the split type hanging buckle 100, such as: the first magnetic element 320 is fixed on the bottom cover 36 through the fixing holes 322 and the fixing posts 362. The protrusion 321 is received in the accommodating groove 361, the bending part 393 is received in the groove 363 of the bottom cover 36 to connect the clip 39 with the bottom cover 36. The clamping part 383 is received in the limiting groove 342, the inserting part 341 is received in the receiving groove 341. After the inserting part 381 is received in the receiving groove 341, the shielding element 343 covers the inserting part 381.

The other properties of the assembly process of the split type hanging buckle 300 according to the third exemplary embodiment are the same with the assembly process of the split type hanging buckle 100 according to the first exemplary embodiment, and no more tautology here.

The other properties of the disassemble process of the split type hanging buckle 300 according to the third exemplary embodiment are the same with the disassemble process of the split type hanging buckle 100 according to the first exemplary embodiment, and no more tautology here.

Referring to FIGS. 20-26, differences between a split type hanging buckle 400 according to a fourth exemplary embodiment and the split type hanging buckle 300 according to the third exemplary embodiment includes: a cross section of a first magnetic element 42 can be substantially "L" shaped, the first magnetic element 42 includes a bottom plate 421 and a cover plate 422, the cover plate 422 is perpendicular to the bottom plate 421, the bottom plate 421 has a hole 4211, the cover plate 422 has a slot 4221, the first magnetic element 42 is partly received in an accommodating groove 462 of the bottom cover 46, a fixing part of the bottom cover 46 pass through the hole 4211, such that the first magnetic element 42 is connected firmly with the bottom cover 46. A coil brace 419 can be arranged around a supporter 417 of the slip type hanging buckle 400, a coil 419 coils the coil brace 418, one end of the coil 419 can pass through a connecting hole 4163 of a roller 416, and a hole 4511 of an inserting part 451, the coil 419 is firmly connected with the inserting part 451, such that the base 40 can be connected with a connecting element through the coil 418. The hole 4511 corresponds to the connecting hole 4163. A fixing space 4161 of the roller 416 is formed at a periphery of the roller 416, the fixing space 4161 can be located in a groove 4431 formed on a shielding element 443 of a top cover 44, such that the roller 416 can be fixed on the shielding element 443.

The other properties of the split type hanging buckle 400 according to the fourth exemplary embodiment are the same with the split type hanging buckle 300 according to the third exemplary embodiment, and no more tautology here.

An assembly process of the split type hanging buckle 400 is slightly different from the assembly process of the split type hanging buckle 300, such as: the first magnetic element 42 is partly received in the accommodating groove 462 of the bottom cover 46, a fixing element 416 formed on the bottom cover 46 can pass through the hole 4211. The coil brace 418 is arranged around the supporter 417, the coil coils the coil brace 419, one end of the coil 419 passes through the connecting hole 4163 of the roller 416 and hole 4511 of the inserting part 451, the coil 419 can be firmly connected with the inserting part 451, such that the base 40 can be connected with the connecting element through the coil 419. The fixing space 4161 is fixed in the groove 4431 of the shielding element 443, such that the roller 416 can be firmly fixed on the shielding element 443.

A disassemble process of the split type hanging buckle 400 according to the fourth exemplary embodiment slightly different from the disassemble process of the split type hanging buckle 300 according to the third embodiment exemplary, such as: the fixing part is pulled to move away from the coil brace 418, and the coil 419 is driven by the fixing part to move away from the coil brace simultaneously, when a user stops pulling the fixing part, the coil 419 can rebound back automatically, and bring the connecting element to move towards the base until the connecting element connects with the base 40.

The other properties of the assembly process of the split type hanging buckle 400 according to the fourth exemplary embodiment are the same with the assembly process of the split type hanging buckle 300 according to the third exemplary embodiment, and no more tautology here.

The other properties of the disassemble process of the split type hanging buckle 400 according to the fourth exemplary embodiment are the same with the disassemble process of the split type hanging buckle 300 according to the third exemplary embodiment, and no more tautology here.

Referring to FIGS. 27-31, differences between a split type hanging buckle 300 according to a second exemplary embodiment and the split type hanging buckle 100 according to the first exemplary embodiment includes: a base 50 of the split type hanging buckle 500 can be a displaying window. One end of the base 50 closing to a connecting element 70 has a receiving element 51, the receiving element 51 forms a receiving groove 511, a first magnetic element 512 is located at a bottom of the receiving groove 511. The connecting element 70 is partly received in the receiving groove 511.

The other properties of the split type hanging buckle 500 according to the fifth exemplary embodiment are the same with the split type hanging buckle 100 according to the first exemplary embodiment, and no more tautology here.

An assembly process of the split type hanging buckle 500 is slightly different from the assembly process of the split type hanging buckle 100, such as: the first magnetic element 71 is located at a bottom of the receiving groove 511, the connecting element 70 is partly received in the receiving groove 511.

The other properties of the assembly process of the split type hanging buckle 500 according to the fifth exemplary embodiment are the same with the assembly process of the split type hanging buckle 100 according to the first exemplary embodiment, and no more tautology here.

The other properties of the disassemble process of the split type hanging buckle 500 according to the fifth exemplary embodiment are the same with the disassemble process of the split type hanging buckle 100 according to the first exemplary embodiment, and no more tautology here.

Referring to FIGS. 32-37, differences between a split type hanging buckle 600 according to a sixth exemplary embodiment and the split type hanging buckle 500 according to the fifth exemplary embodiment includes: a coil brace (not shown) is received in the base 60, a coil 619 coils the coil brace, and one end of the coil 619 can pass through a hole 63 of a receiving groove 61 and a channel (not shown) of an inserting part 71, the coil 619 can be received in the inserting part 71, the channel of the inserting part corresponds to the hole 63.

The other properties of the split type hanging buckle 600 according to the sixth exemplary embodiment are the same with the split type hanging buckle 500 according to the fifth exemplary embodiment, and no more tautology here.

An assembly process of the split type hanging buckle 600 is slightly different from the assembly process of the split type hanging buckle 5100, such as: the coil 619 coils the coil brace, the one end of the coil 619 passes through the hole 63 and the channel of the inserting part 71 to be received in the inserting part 71.

A disassemble process of the split type hanging buckle 200 is slightly different from the disassemble process of the split type hanging buckle 100, such as: the fitting part is pulled to move away from the coil brace to drive the coil 619 to extend away from the coil brace. When user stops pulling the fitting part, coil 619 can rebound back automatically, such that the connecting element can be connected with the base automatically.

The other properties of the assembly process of the split type hanging buckle 600 according to the sixth exemplary embodiment are the same with the assembly process of the split type hanging buckle 500 according to the fifth exemplary embodiment, and no more tautology here.

The other properties of the disassemble process of the split type hanging buckle 600 according to the sixth exemplary embodiment are the same with the disassemble process of the split type hanging buckle 500 according to the fifth exemplary embodiment, and no more tautology here.

Although the features and elements of the present disclosure are described as embodiment in particular combinations, each feature or element can be used alone or in other various combinations within the principles of the present disclosure to the full extent indicated by the broad general meaning of the terms in which the appended claims are expressed.

What is claimed is:

1. A split type hanging buckle, comprising a base and a connecting element connected with the base, the base comprising a top cover and a bottom cover, the top cover having a receiving groove, one end of the bottom cover closing to the connecting element having an accommodating groove, the accommodating groove corresponding to the receiving groove, the connecting element including a first magnetic element, a second magnetic element attracting the first magnetic element, a connecting part and a fitting part, the first magnetic element being received in the accommodating groove, one end of the connecting part having an inserting part and a clamping part, and the inserting part being located on a surface of the clamping part, one end of the inserting part having a receiving cavity, the second magnetic element being received in the receiving cavity, after the second magnetic element being received in the receiving cavity, and the first magnetic being received in the accommodating groove, portions of the second magnetic element away from the inserting part attracting the first magnet element, such that the connecting element being connected with the base;

wherein parts of the fitting part and the inserting part are received in the receiving groove, such that the connecting part and the fitting part are both connected with the base;

and wherein two opposite stops are formed on two opposite sidewalls of the receiving groove respectively; one end of the fitting part has two opposite pressing plates, one end of each pressing plate has one bulge, the bulges are fitted on corresponding stops, such that the connecting element is connected with the base.

2. The split type hanging buckle of claim 1, wherein a middle area of each pressing plate further has a lug, one end of the connecting part away from the inserting part further has an accommodating cavity, the accommodating cavity has two opposite side openings and a bottom opening, the bottom opening is located between the two side openings, the fitting part passes through the bottom opening to be received in the accommodating groove, the bulges and the lugs pass through the side openings to be exposed from the side openings respectively.

3. The split type hanging buckle of claim 2, wherein a clamping element is located between the two pressing plates, a surface of the clamping element has a flanging element; an elastic element is formed on a sidewall of the accommodating groove, the flanging element resist and press the elastic element, such that the connecting part is connected with the fitting part.

4. The split type hanging buckle of claim 3, wherein the two pressing plates are pressed towards each other, such that the bulges move towards each other to be released from the stops, and the lugs move towards each other to be received in an accommodating cavity.

5. The split type hanging buckle of claim 4, wherein the elastic element is pressed to move towards a middle of the connecting part, and then the elastic element is released, and the elastic element rebounds back, such that the flanging element is released from the elastic element, and the connecting part is separated from the fitting part.

6. The split type hanging buckle of claim 5, wherein two opposite limiting elements are formed on two opposite sides of the end of the connecting part closing to the fitting part, the fitting part is pulled to move away from the base, when the bulges of the fitting part moves to a bottom of the accommodating groove, the bulges are stopped by the limiting elements, such that the fitting part is connected with the connecting part through the bulges and the limiting elements.

7. The split type hanging buckle of claim 5, wherein one end of the fitting part away from the base has a connecting member, a middle area of the connecting member has a receiving hole, the receiving hole is a through hole, one end of the connecting member has a switch, the switch opens or locks the connecting member, such that objects are received in the receiving hole to be connected with the fitting part through the switch.

8. The split type hanging buckle of claim 7, wherein an inner surface of the connecting member further has a slot, the slot extends along an axis of the connecting member, and the slot ensure that the switch open or lock the connecting member smoothly.

9. The split type hanging buckle of claim 1, wherein the first magnetic element and the second magnetic element are made of magnet, or various kinds of metals which attract magnet.

10. The split type hanging buckle of claim 9, wherein the first magnetic element and the second magnetic element are made of magnet; the first magnetic element is made of magnet, and the second magnetic element is made of metal which attracts magnet; or the second magnetic element is made of magnet, the first magnetic element is made of metal which attracts magnet.

11. The split type hanging buckle of claim 1, wherein a diameter of the clamping part is bigger than a diameter of the inserting part.

12. The split type hanging buckle of claim 1, wherein the split type hanging buckle further includes a clip connected with the bottom cover.

13. The split type hanging buckle of claim 1, wherein a groove is formed on an inner surface of the top cover, another groove is formed on a surface of the bottom cover facing the top cover, the groove of the top cover and the groove of the bottom cover cooperatively form a receiving space.

14. The split type hanging buckle of claim 13, wherein a supporter is located at the groove of the top cover, a coil brace is received in the receiving space, and the coil brace is arranged around the coil brace, a coil coils the coil brace.

15. The split type hanging buckle of claim 14, wherein one end of the coil pass through the accommodating groove and a hole of the inserting part, and parts of the coil exposed from the accommodating groove and the hole of the inserting part are received in the inserting part and connected with the inserting part.

16. The split type hanging buckle of claim 15, wherein the coil rebounds back automatically towards the base, the connecting part and the fitting part connected with the coil are driven by the coil to move towards the base, until the inserting part is received in the receiving groove, and the second magnetic element attracts the first magnetic element to connect the connecting element with the base.

17. The split type hanging buckle of claim 1, wherein the base is a displaying window.

* * * * *